(12) United States Patent
Dallmann et al.

(10) Patent No.: US 11,859,579 B1
(45) Date of Patent: Jan. 2, 2024

(54) SYSTEM FOR MULTIPLE BURNS FROM A ROCKET MOTOR

(71) Applicant: Triad National Security, LLC, Los Alamos, NM (US)

(72) Inventors: Nicholas Dallmann, Los Alamos, NM (US); Ian Shelburne, Los Alamos, NM (US); Kavitha Chintam, Los Alamos, NM (US); Malakai Coblentz, Los Alamos, NM (US); David Hemsing, Los Alamos, NM (US); Joseph Lichthardt, Los Alamos, NM (US); Bryce Tappan, Los Alamos, NM (US); Mahlon S. Wilson, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 19 days.

(21) Appl. No.: 16/941,642

(22) Filed: Jul. 29, 2020

Related U.S. Application Data

(60) Provisional application No. 62/879,783, filed on Jul. 29, 2019, provisional application No. 62/879,818, filed on Jul. 29, 2019.

(51) Int. Cl.
*F02K 9/86* (2006.01)
*F02K 9/76* (2006.01)
(Continued)

(52) U.S. Cl.
CPC .............. *F02K 9/86* (2013.01); *F02K 9/28* (2013.01); *F02K 9/34* (2013.01); *F02K 9/763* (2013.01);
(Continued)

(58) Field of Classification Search
CPC ..... F02K 9/82; F02K 9/84; F02K 9/86; F02K 9/34; F16K 1/12; F16K 1/38; F16K 1/385;
(Continued)

(56) References Cited

U.S. PATENT DOCUMENTS

| 3,043,104 A * | 7/1962 | Magnus, Jr. ............ F02C 7/236 60/39.281 |
| 3,102,550 A * | 9/1963 | Shand ...................... F16K 1/12 251/282 |

(Continued)

FOREIGN PATENT DOCUMENTS

EP    0079147 A1 *  5/1983

OTHER PUBLICATIONS

NASA, Rocket Thrust Summary, May 13, 2016 (Year: 2016).*
(Continued)

*Primary Examiner* — Todd E Manahan
*Assistant Examiner* — Kyle Robert Thomas
(74) *Attorney, Agent, or Firm* — Alston & Bird LLP

(57) ABSTRACT

A system for multiple burns from a solid fuel rocket motor may extinguish rocket fuel after the rocket has been ignited. The motor may be extinguished via rapid decompression of the combustion chamber. The fuel may then be reignited by a suitable igniter, and the process of extinguishing and reigniting may be repeated, enabling multi-burn maneuvers. A decompressive extinguishing plug nozzle may extinguish solid rocket fuel after the rocket has been ignited and/or keep a rocket in a disarmed (zero thrust) state until the rocket is to be armed. The nozzle may include a plug that mostly impedes the opening of the nozzle and an outer cowl that is movable to rapidly decompress the combustion chamber.

(Continued)

This rapid decompression extinguishes the solid rocket fuel. In some aspects, the fuel can be reignited and extinguished multiple times.

18 Claims, 29 Drawing Sheets

(51) Int. Cl.
    *F02K 9/34*     (2006.01)
    *F02K 9/28*     (2006.01)
    *F02K 9/84*     (2006.01)

(52) U.S. Cl.
    CPC ........ *F02K 9/84* (2013.01); *F05D 2240/1281* (2013.01)

(58) Field of Classification Search
    CPC ......... F16K 31/52408; F16K 31/52433; F16K 31/5245; G05D 7/0635
    USPC ........................................................ 251/124
    See application file for complete search history.

(56) References Cited

U.S. PATENT DOCUMENTS

| | | | | |
|---|---|---|---|---|
| 4,777,795 A | * | 10/1988 | Le Corre | F02K 9/86 239/265.19 |
| 4,826,104 A | * | 5/1989 | Bennett | F02K 9/805 239/265.19 |
| 5,456,425 A | * | 10/1995 | Morris | F02K 9/805 244/3.22 |
| 2009/0230212 A1 | * | 9/2009 | Barr | F01D 17/141 239/265.19 |

OTHER PUBLICATIONS

Bryce C. Tappan et al., "30th Annual AIAA/USU Conference on Small Satellites," 30th Annual AIAA/USU Conference on Small Satellites (Aug. 9, 2016)—article.

Bryce C. Tappan et al., "High DeltaV Solid Propulsion System for Small Satellites," 30th Annual AIAA/USU Conference on Small Satellites (Aug. 9, 2016)—presentation.

M. S. Wilson et al., "CVD Catalyzed PEM Fuel Cell and Electrolyzer Electrodes," AiMES 2018, ECS and SMEQ Joint International Meeting, Cancun, Mexico (Oct. 2, 2018).

MIT rocket performance lecture available at http://web.mit.edu/16. unified/www/SPRING/propulsion/Mud/P5mud.html (last accessed Jun. 13, 2019).

* cited by examiner

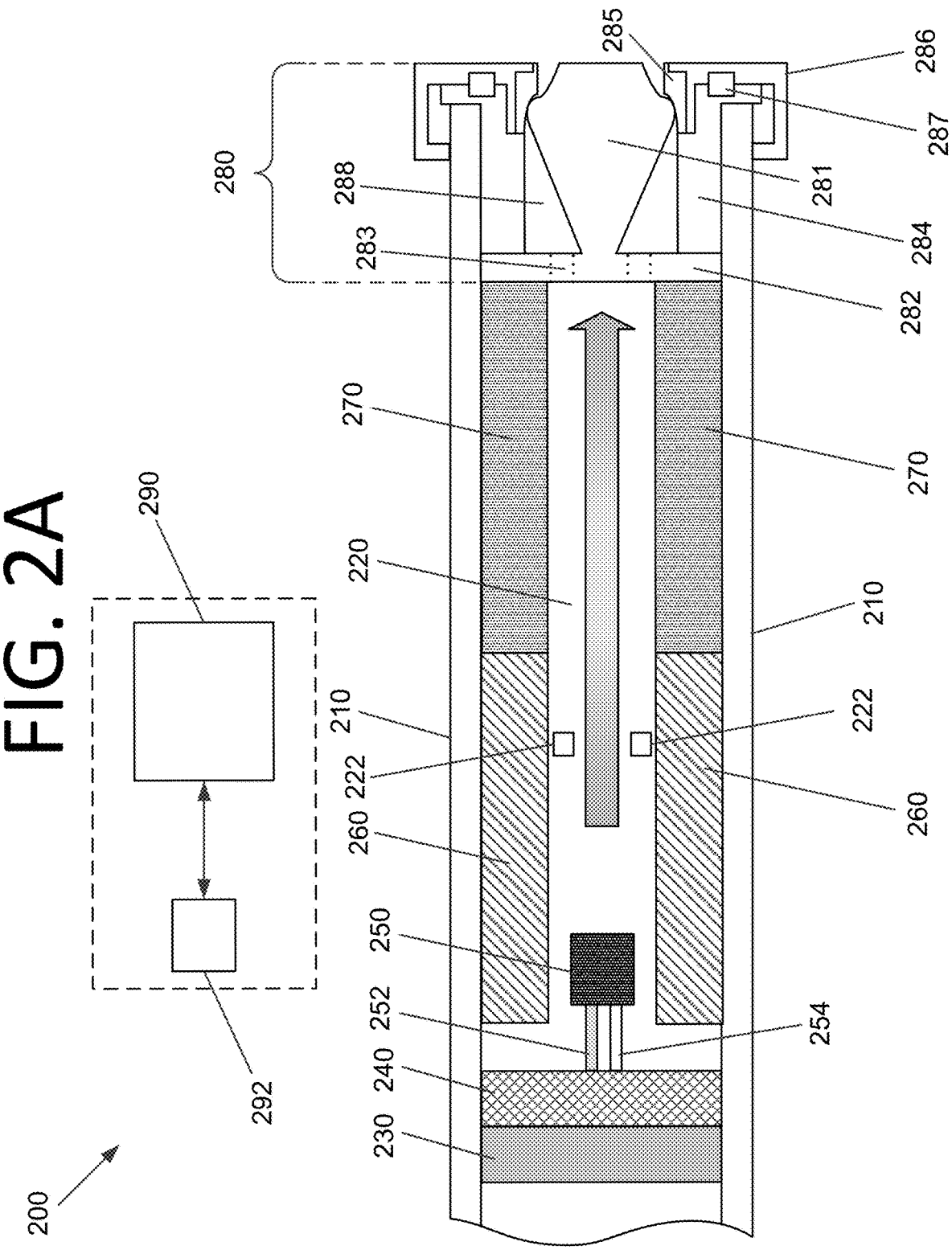

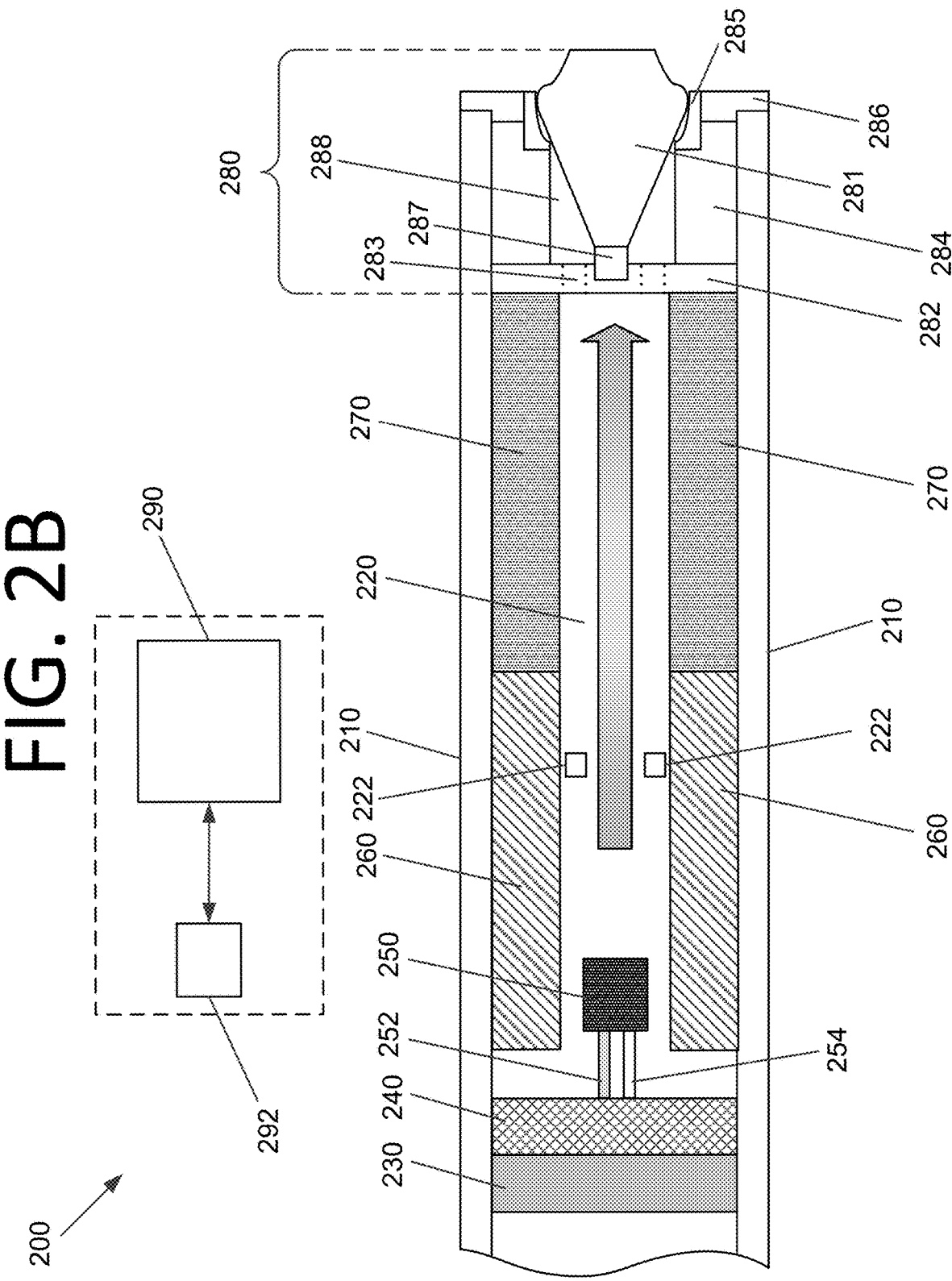

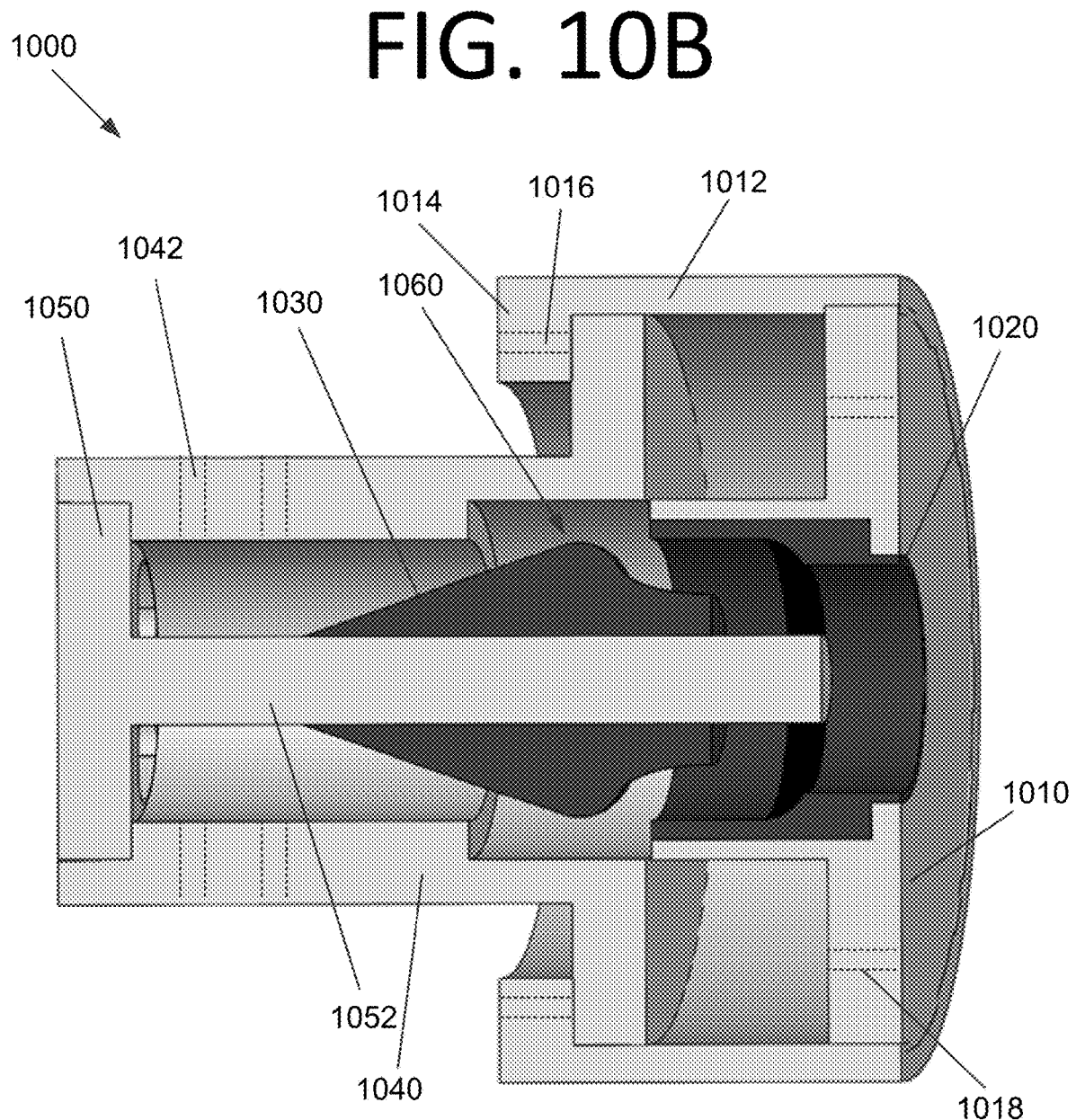

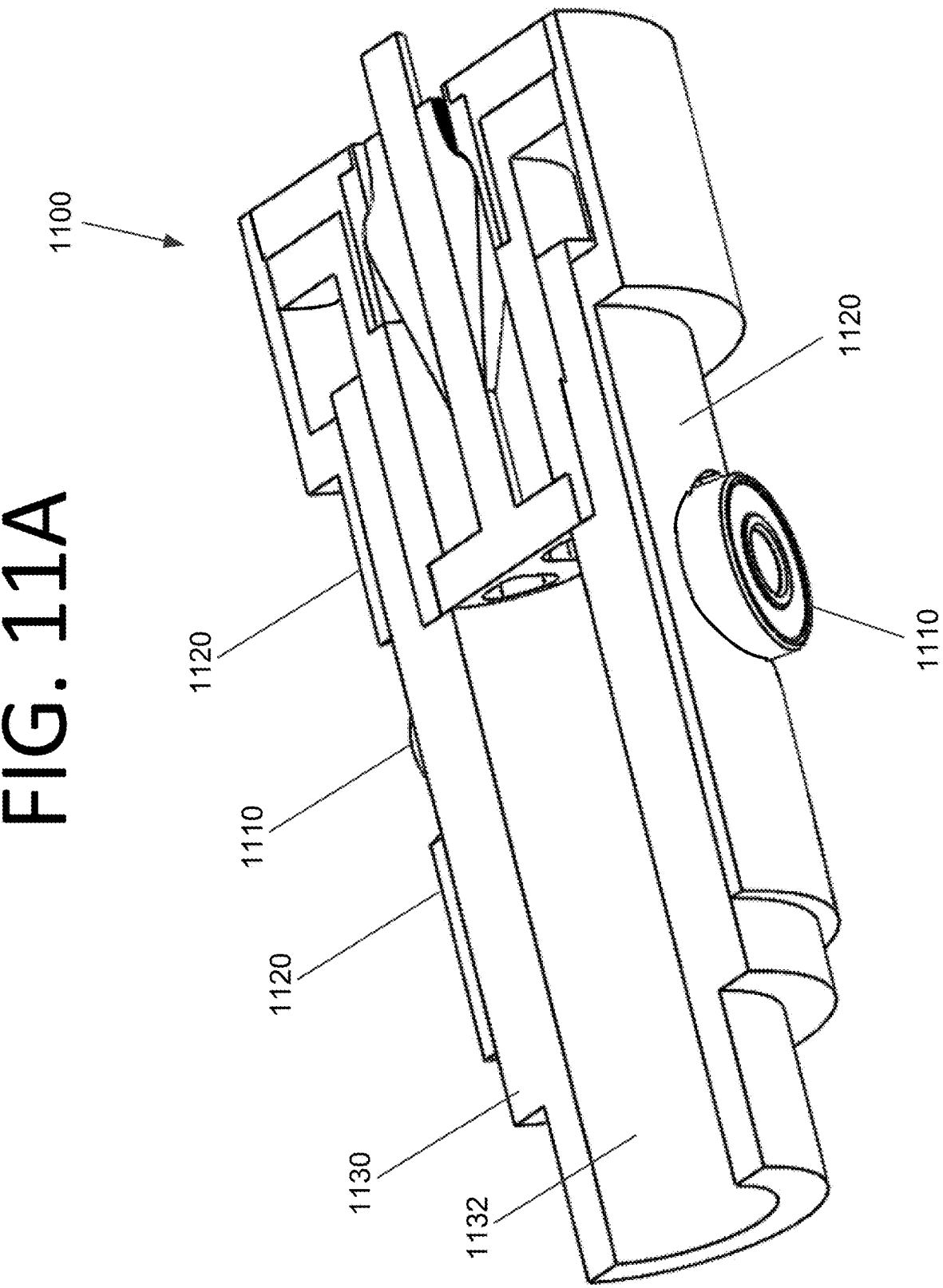

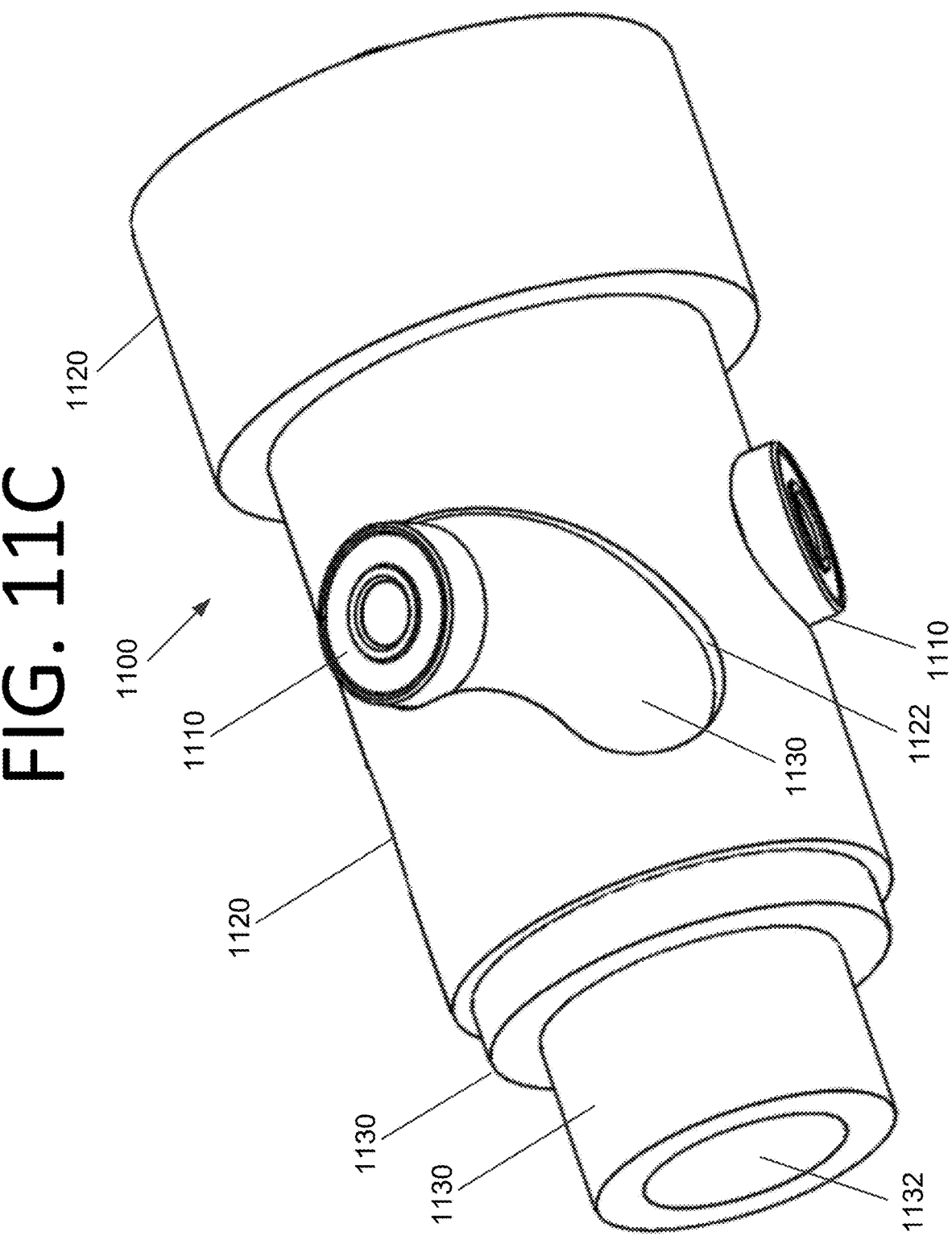

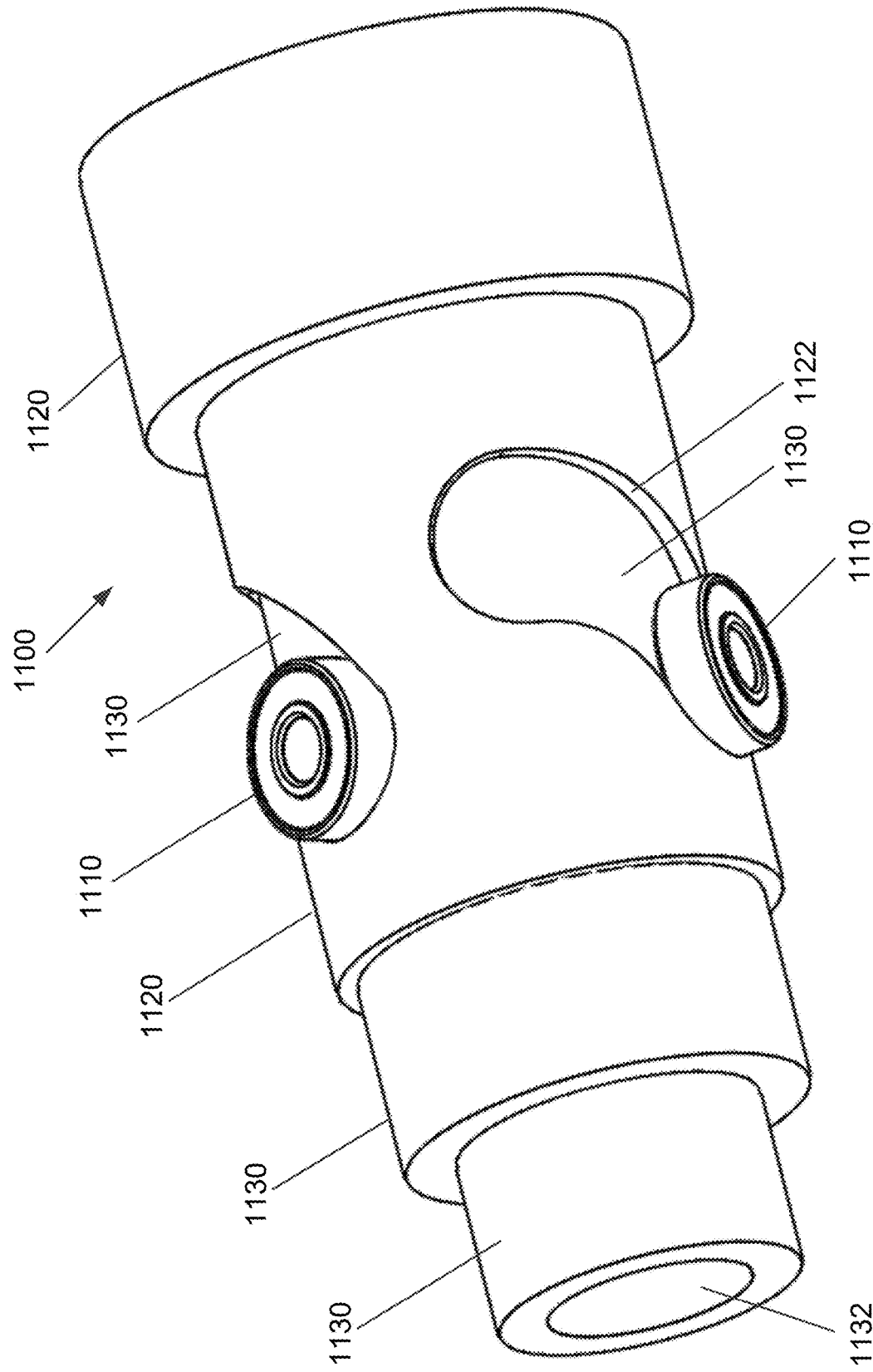

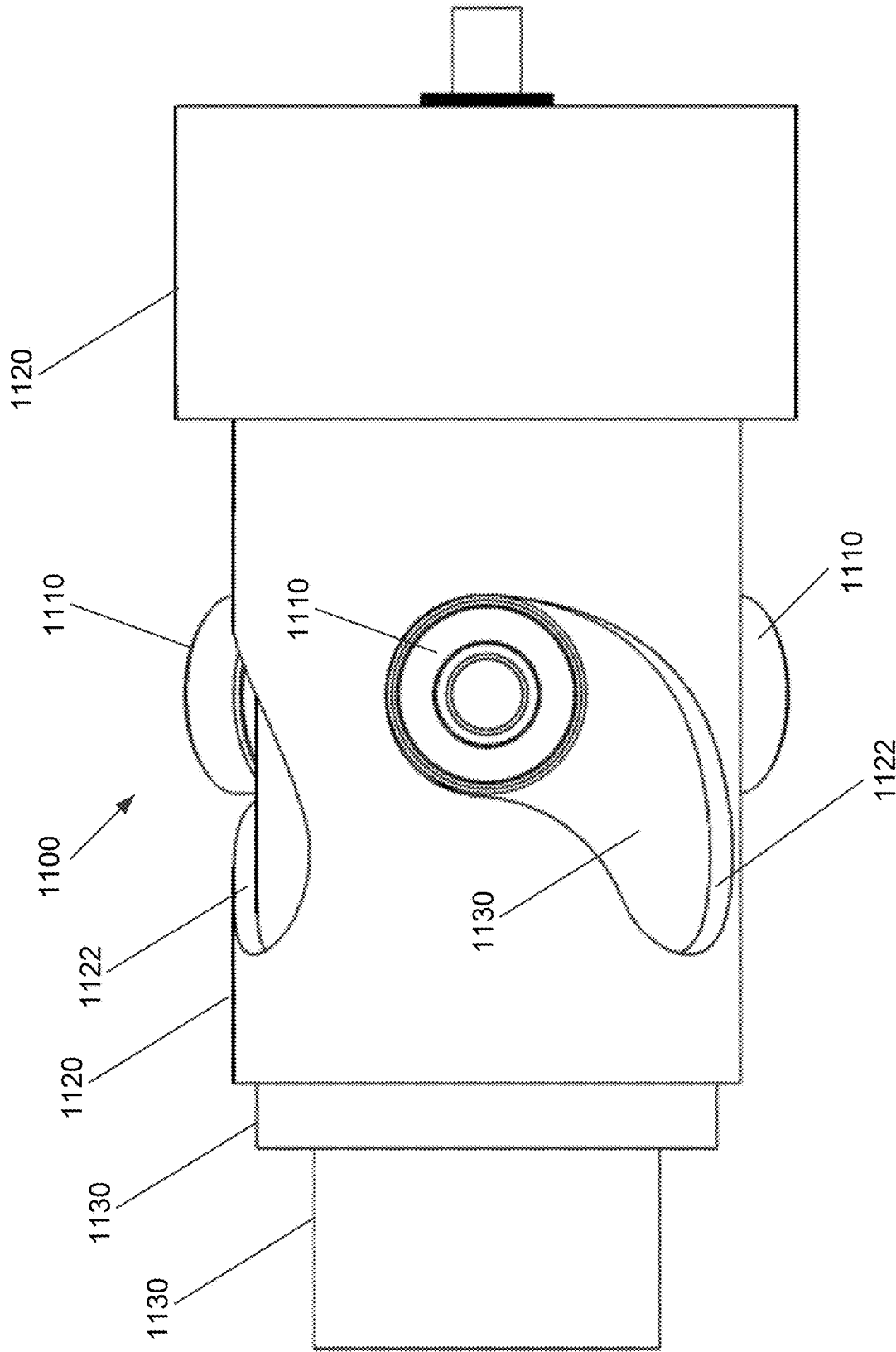

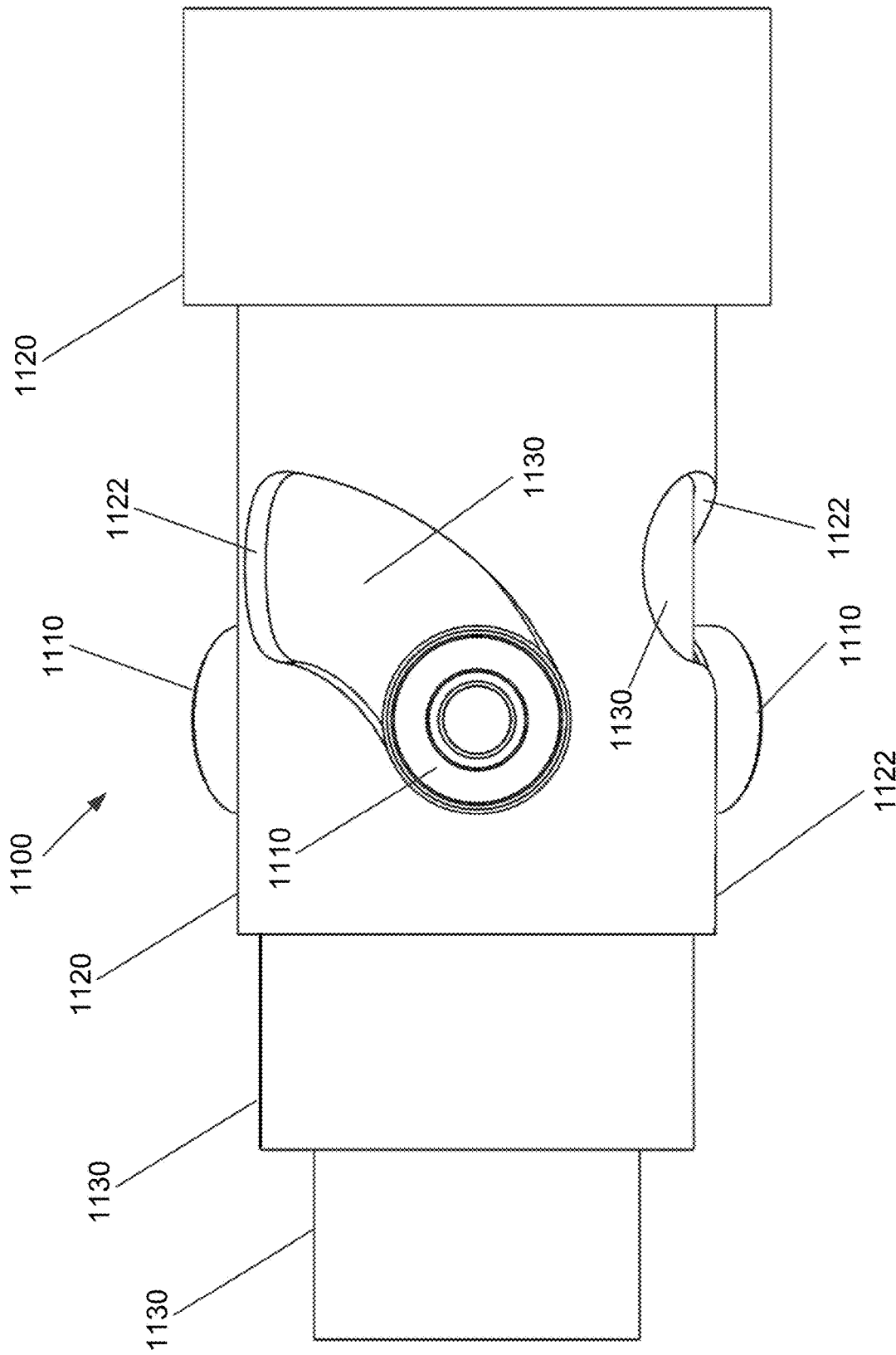

SYSTEM FOR MULTIPLE BURNS FROM A ROCKET MOTOR

CROSS-REFERENCE TO RELATED APPLICATIONS

This application claims the benefit of U.S. Provisional Patent Application Nos. 62/879,783 and 62/879,818, both filed on Jul. 29, 2019. The subject application of these earlier-filed applications is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to propulsion systems, and more particularly, to a system that enables multiple burns from a solid fuel rocket motor that may include a decompressive extinguishing plug nozzle that can extinguish solid rocket fuel after the rocket has been ignited and/or keep a rocket in a disarmed (zero thrust) state until the rocket is to be armed.

BACKGROUND

Solid rocket systems are typically limited to only a single burn. Once ignited, all fuel of a conventional solid rocket will be consumed by the burn, and naturally extinguish or be forcibly and irreparably extinguished after achieving the desired impulse. This limitation significantly curtails the use of solid rockets and constrains the operational options to those applications in which they are traditionally employed in a single burn configuration, such as rockets of any size, booster stages for larger spacecraft (e.g., the space shuttle, the Delta IV rocket, and the like), missiles, etc. Accordingly, an improved solid rocket propulsion system may be beneficial.

SUMMARY

Certain embodiments of the present invention may provide solutions to the problems and needs in the art that have not yet been fully identified, appreciated, or solved by conventional propulsion technologies. For example, some embodiments of the present invention pertain to a system that enables multiple burns from a solid fuel rocket motor. The solid rocket system of some embodiments may include a catalytic igniter or a spark igniter capable of operating at combustion chamber temperatures. Certain embodiments pertain to a decompressive extinguishing plug nozzle that can extinguish solid rocket fuel after the rocket has been ignited and/or keep a rocket in a disarmed (zero thrust) state until the rocket is to be armed.

In an embodiment, a multiple burn rocket system includes a hydrogen gas source and an oxygen gas source that provide gaseous hydrogen and oxygen, respectively. The multiple burn rocket system also includes a combustion chamber that is provided with the hydrogen gas and the oxygen gas and an igniter configured to ignite the hydrogen gas and the oxygen gas. The igniter is located at least partially in the combustion chamber. The multiple burn rocket system further includes fuel located within the combustion chamber that is configured to be ignited by the igniter and a decompressive nozzle that is configured to allow the fuel to burn in an active configuration and to extinguish the fuel in a decompressive configuration. The multiple burn rocket system is configured to reignite the fuel after the fuel is extinguished.

In another embodiment, a decompressive extinguishing plug nozzle includes an outer cowl, a cowl housing, a plug, and a variable mechanical throat defining a choked sonic flow when the decompressive extinguishing plug nozzle is in an active configuration. The decompressive extinguishing plug nozzle is configured to transition from a sealed configuration to the active configuration to a decompressive configuration, and then back to the sealed configuration.

In yet another embodiment, a decompressive extinguishing plug nozzle includes an outer cowl, a cowl housing, a plug, a plug housing that houses the plug, a plug seal, and a variable mechanical throat defining a choked sonic flow when the decompressive extinguishing plug nozzle is in an active configuration. The plug housing is connected to the plug via the plug seal. The plug housing includes a first lip, the outer cowl or the cowl housing include a second lip, and the first lip and the second lip are configured to limit a range of motion of the outer cowl when the decompressive extinguishing plug nozzle transitions from the active configuration to a decompressive configuration.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 2A and 2B are side cutaway views illustrating a solid rocket motor with a multiple burn system, according to an embodiment of the present invention.

FIG. 10B is a side cutaway view illustrating the decompressive extinguishing plug nozzle in a decompressive configuration, according to an embodiment of the present invention.

FIG. 11A is a perspective cutaway view illustrating a decompressive extinguishing plug nozzle in an active configuration, according to an embodiment of the present invention.

FIG. 11C is a perspective view illustrating the decompressive extinguishing plug nozzle in the active configuration, according to an embodiment of the present invention.

FIG. 11D is a perspective view illustrating the decompressive extinguishing plug nozzle in the decompressive configuration, according to an embodiment of the present invention.

FIG. 11E is a side view illustrating the decompressive extinguishing plug nozzle in the active configuration, according to an embodiment of the present invention.

FIG. 11F is a side view illustrating the decompressive extinguishing plug nozzle in the decompressive configuration, according to an embodiment of the present invention.

Unless otherwise indicated, similar reference characters denote corresponding features consistently throughout the attached drawings.

DETAILED DESCRIPTION OF THE EMBODIMENTS

Figure 1:
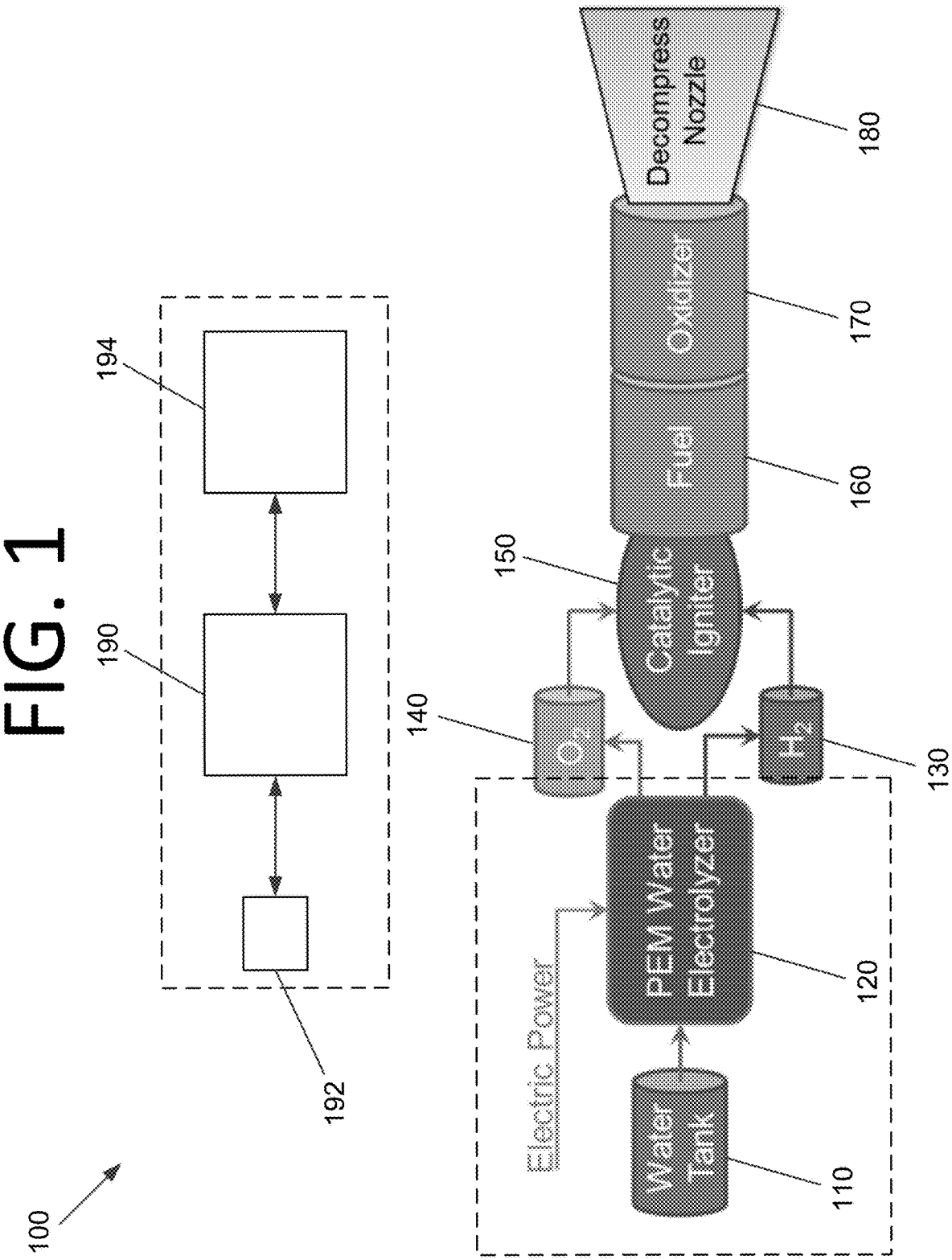
FIG. 1 is an architectural diagram illustrating a solid rocket multiple burn system, according to an embodiment of the present invention.

Some embodiments of the present invention pertain to a system that enables multiple burns from a solid fuel rocket motor. Rather than using a one-use ignition system as in conventional solid rockets, for example, some embodiments employ a multi-use ignition system that can reignite the rocket at least two times, and in some embodiments, many times. For example, in some embodiments, 10-20 burns may be possible since this should be able to accomplish most maneuvers. However, any desired number of burns may be possible without deviating from the scope of the invention. In certain embodiments, a non-damaging extinguishing system is included that is capable of extinguishing the rocket via rapid decompression and then returning the rocket to a configuration where it can be reignited.

Some embodiments of the present invention pertain to a decompressive extinguishing plug nozzle that can extinguish solid rocket fuel after the rocket has been ignited and/or keep a rocket in a disarmed (zero thrust) state until the rocket is to be armed. Certain embodiments provide a non-damaging extinguishing system including a nozzle with a mechanically variable throat. This mechanically variable throat affects rapid decompression of the combustion chamber, resulting in extinguishing of the burn. The nozzle may then be returned to the "active" configuration shortly thereafter, or whenever desired. The nozzle may include a plug that partially impedes the opening of the nozzle and an outer cowl that is movable to rapidly decompress the combustion chamber, changing the open area of the mechanically variable throat. The decompressive extinguishing plug nozzle of some embodiments may be useful for terrestrial or space solid fuel rocket propulsion systems of any desired size, complexity, and/or application without deviating from the scope of the invention. For terrestrial applications, for example, such a decompressive extinguishing plug nozzle has the added benefit of reduced dependency of exhaust expansion on altitude during atmospheric flight.

In some embodiments, the rocket may be kept in a disarmed, decompressive configuration for added safety against an accidental impulsive firing. The general concept would be to arm the system by pulling in the cowl prior to firing the rocket. Such a nozzle may be used just for this safety/arming purpose regardless of extinguishing in certain embodiments.

Solid rocket systems have various benefits over liquid rocket systems, such as being less complex, reliable, low cost, and capable of fully fueled storage for long periods of time. Solid rocket systems may also be safer than liquid rocket systems. Safety may be of particular importance for relatively small space vehicles that are typically launched together in a dispenser or other delivery system, such as CubeSats. In such missions, risks to the primary mission are not tolerated, which limits the materials that may be used for propulsion on orbit (e.g., for maneuvers or to place the space vehicle into a higher or lower orbit). Also, long and indeterminate storage times are often required and/or a significant time on orbit may occur prior to thrusting. Furthermore, the scalability of solid rockets provides an advantage. Since solid rockets typically have little valving, piping, pumps, etc. as compared to liquid rockets, solid rockets can be scaled over a large range in fine increments to emphasize different desired characteristics.

Small space vehicles are being applied to an increasingly diverse set of commercial, national security, and science missions. This begets a corresponding demand for diversity in propulsion system capability. Virtually any orbit maneuver that a satellite or other space vehicle may need to perform requires multiple burns. Furthermore, to be practical, multiple independently controllable pulses with good impulse are typically required. Solid rocket systems provide relative safety, low cost, low power, scalability, the ability to be stored for long periods of time, the lack of a requirement for pressurized tanks, and good impulse. Conventional solid rockets systems are not suitable for such applications since they provide only a single burn at a fixed impulse per motor. However, the system of some embodiments enables a suitable solid rocket motor to be extinguished and then subsequently reignited, if desired.

Figure 4:
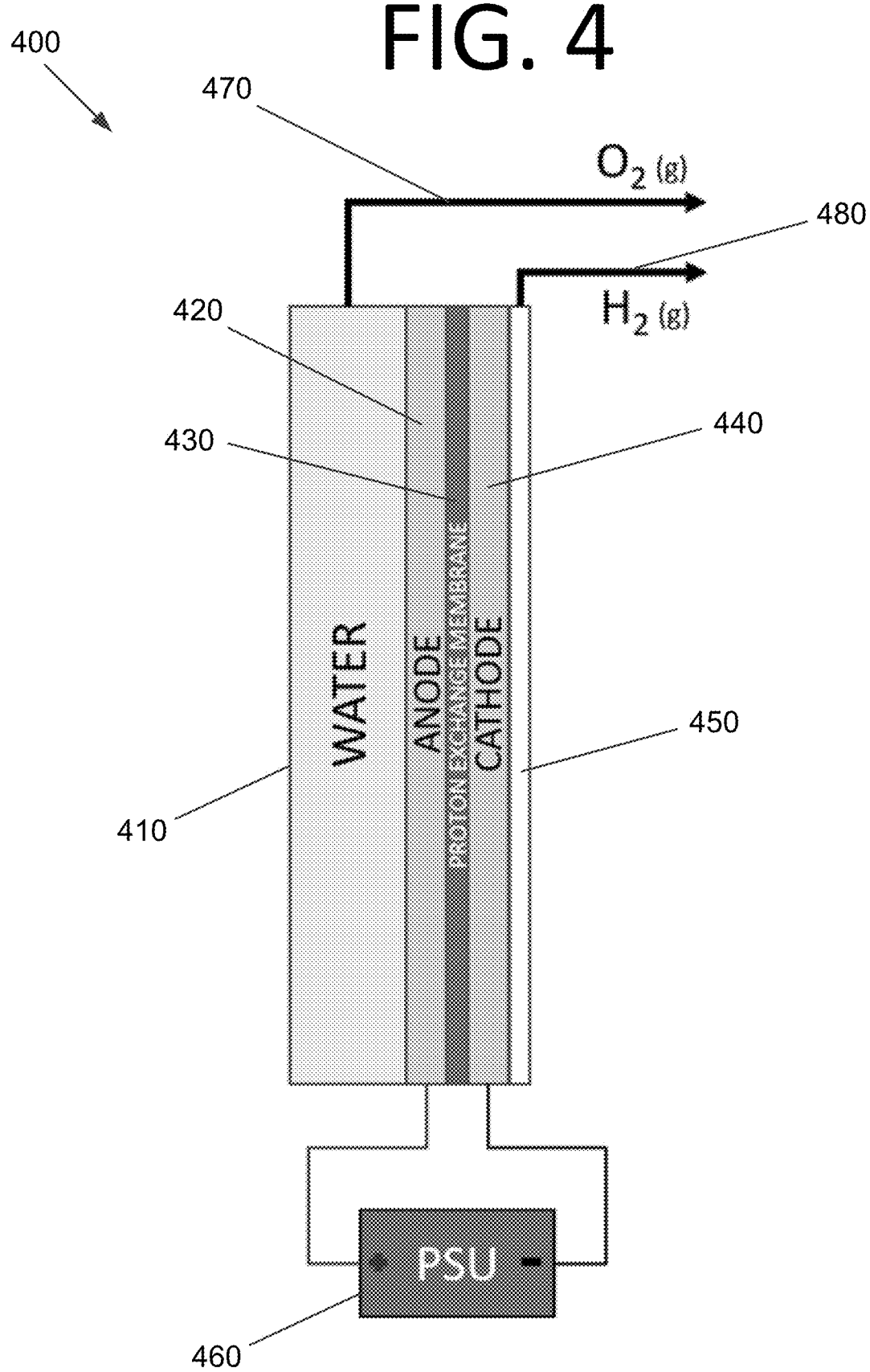
FIG. 4 is an architectural diagram illustrating an electrolyzer, according to an embodiment of the present invention.
Figure 5:
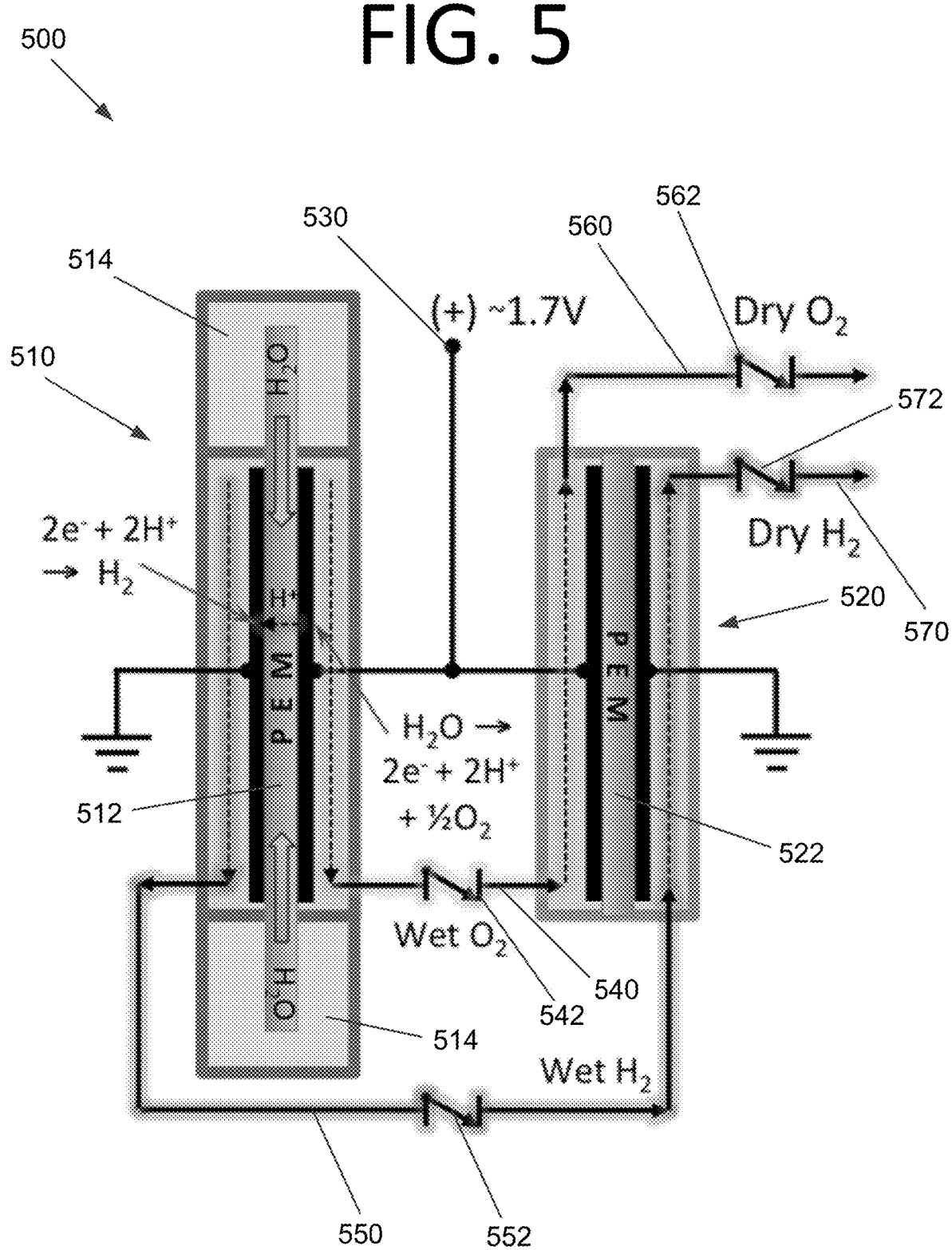
FIG. 5 is an architectural diagram illustrating a dual cell electrolyzer, according to an embodiment of the present invention.

FIG. 1 is an architectural diagram illustrating a solid rocket multiple burn system 100, according to an embodiment of the present invention. System 100 includes a water reservoir 110 that provides a base source for hydrogen ($H_2$) and oxygen ($O_2$), which are separated from the water molecules via a proton exchange membrane (PEM) electrolyzer 120. Electrolyzer 120 includes electrodes (e.g., electrodes produced via chemical vapor decomposition (CVD)) that are supplied with current from batteries 194 to perform electrolysis. Nonlimiting example embodiments of electrolyzers 400, 500 are shown in FIGS. 4 and 5, respectively. However, it should be noted that any suitable electrolyzer may be used without deviating from the scope of the invention. The separated hydrogen 130 and oxygen 140 are then supplied to an igniter 150. In some embodiments, water reservoir 110 and electrolyzer 120 are not included. Instead, hydrogen and oxygen are supplied by respective storage tanks 130, 140.

Figure 6A:
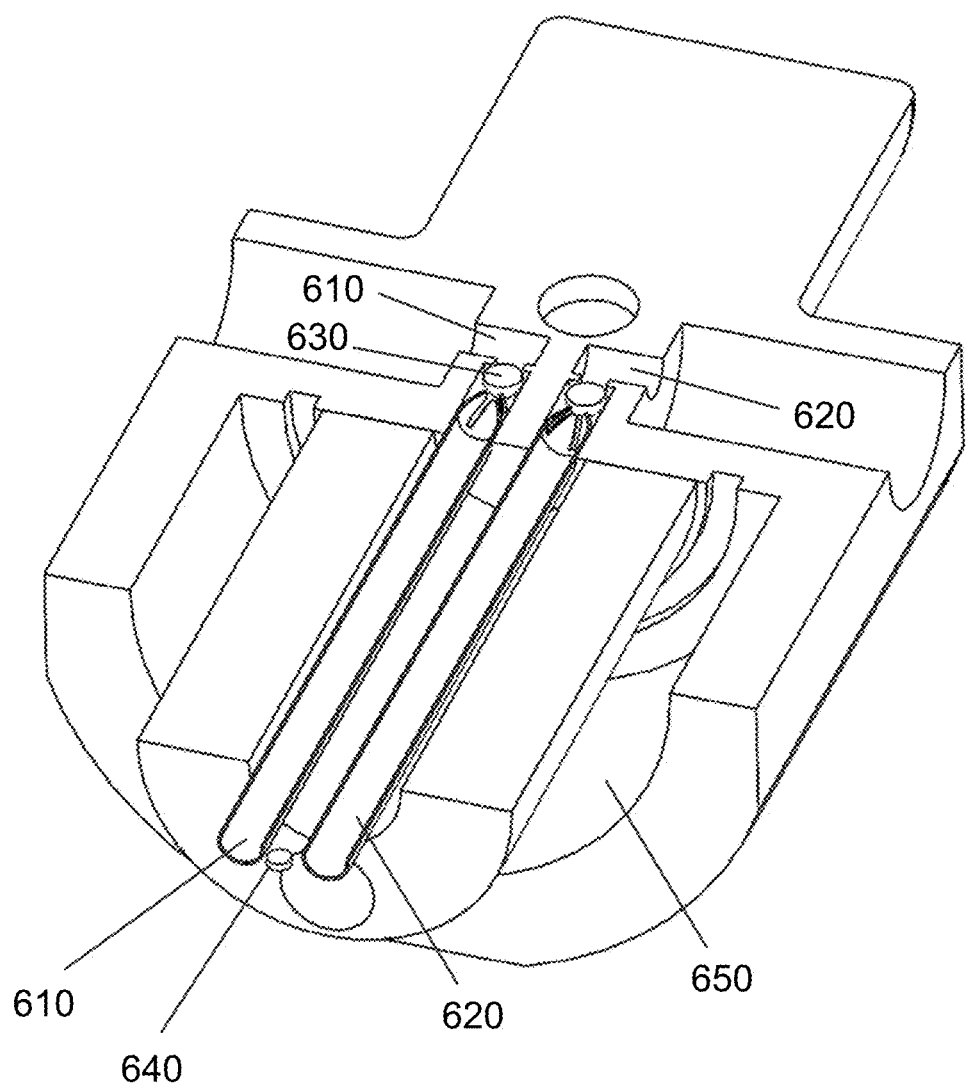
FIG. 6A is a perspective cutaway view illustrating a catalytic igniter, according to an embodiment of the present invention.
Figure 6B:
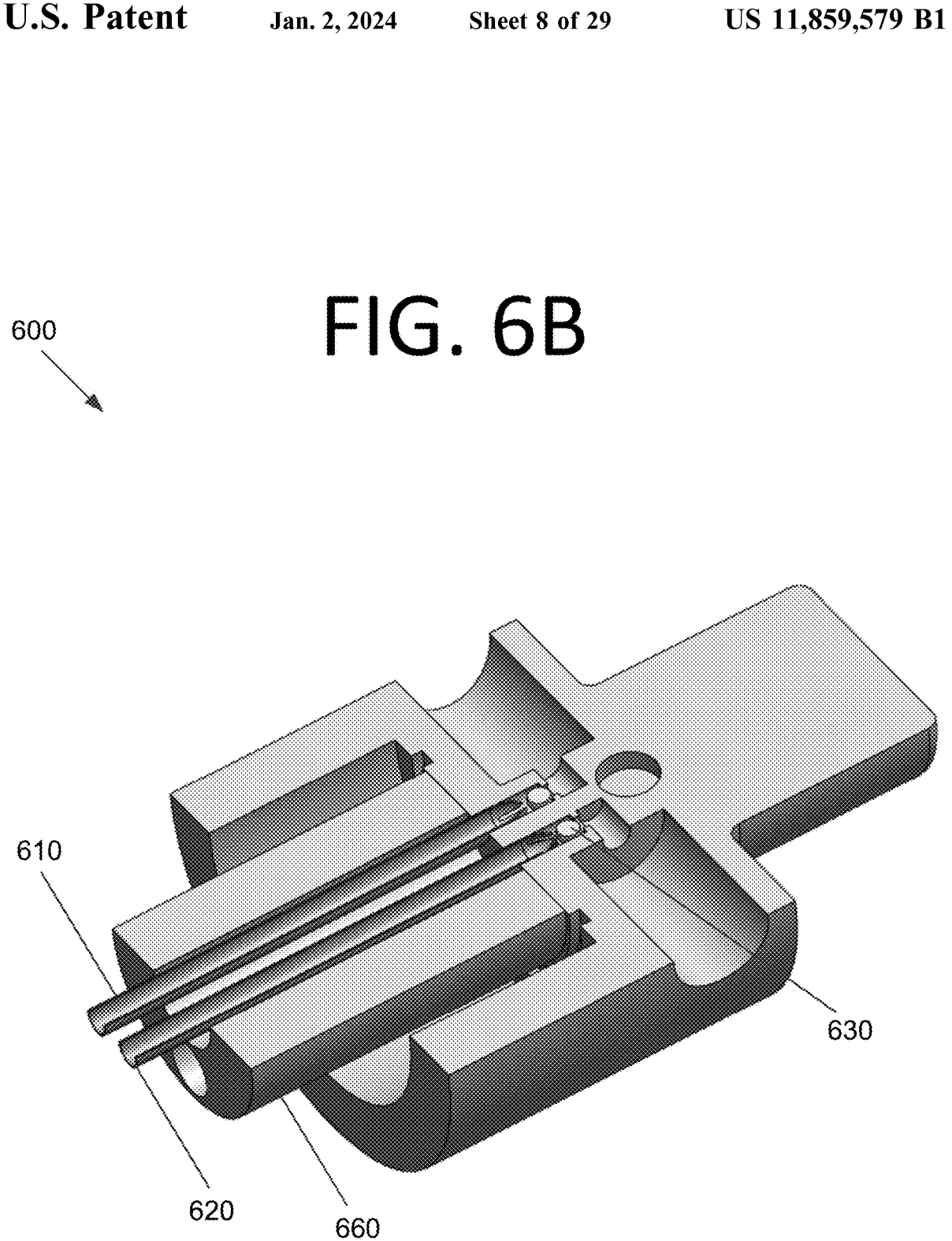
FIG. 6B is another perspective cutaway view illustrating the catalytic igniter of FIG. 6A, according to an embodiment of the present invention.
Figure 7A:
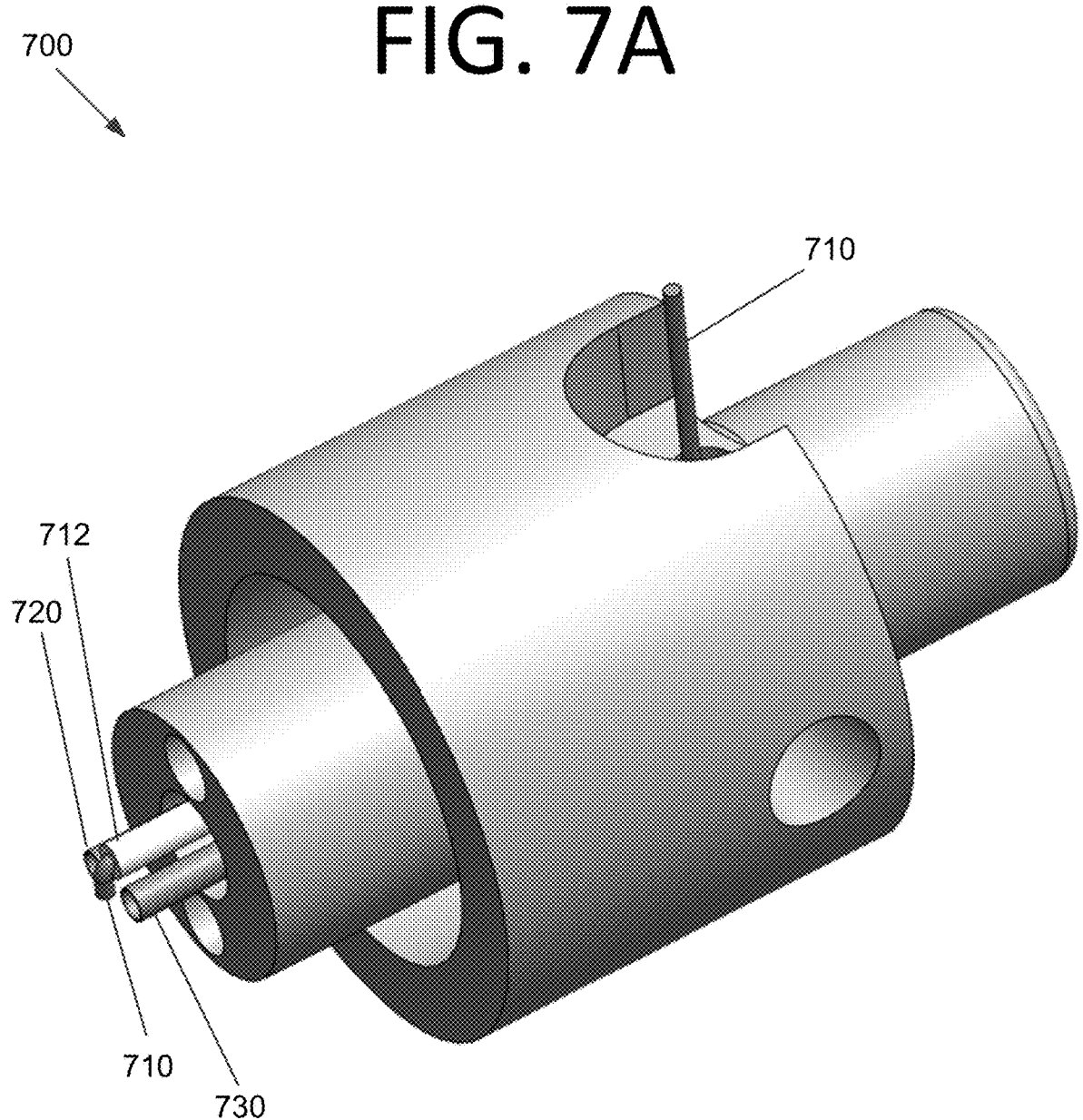
FIG. 7A is a perspective view illustrating a spark igniter, according to an embodiment of the present invention.
Figure 7B:
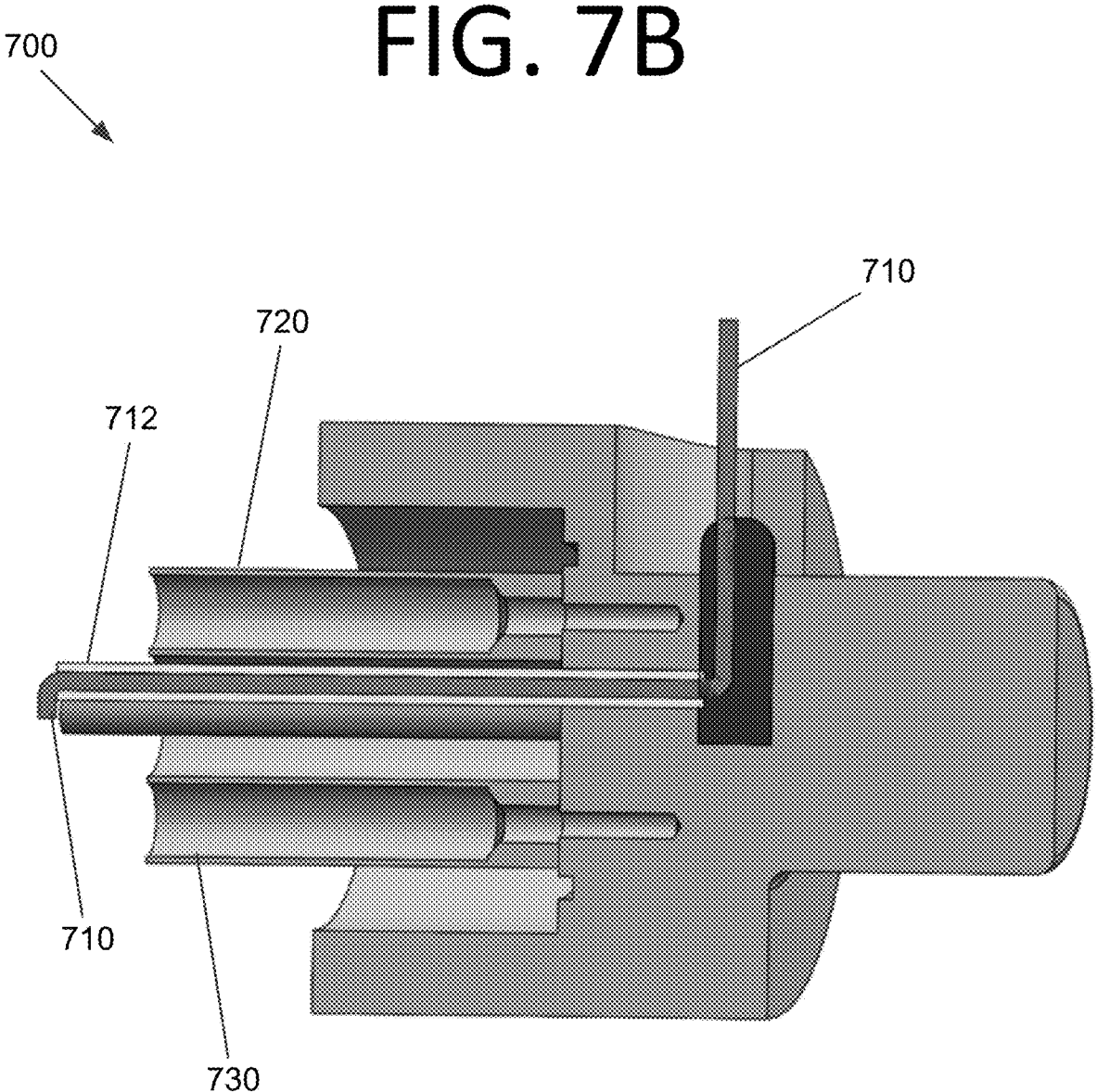
FIG. 7B is a perspective cutaway view illustrating the spark igniter of FIG. 7A, according to an embodiment of the present invention.

Igniter 150 in this embodiment is a catalytic igniter that recombines the gaseous hydrogen and oxygen on a catalyst bed (see, e.g., FIGS. 6A and 6B). The catalyst bed could be alumina with approximately 10% iridium, a precious metal catalyst, or any other suitable catalyst capable of causing high temperatures and igniting the hydrogen and oxygen without deviating from the scope of the invention. Igniter 150 may also be a spark igniter (see, e.g., FIGS. 7A and 7B) that directly ignites the gaseous hydrogen and oxygen. Indeed, any suitable igniter that can survive the associated temperatures and pressures (e.g., temperatures of 2,000° C. to 3,000° C. or more and pressures of 700 to 1,500 pounds per square inch (psi) or more) may be used without deviating from the scope of the invention. The igniter may be constructed from a high temperature steel alloy, a metalized ceramic, or any other suitable high temperature material(s) without deviating from the scope of the invention.

The ignited hydrogen and oxygen then ignite solid fuel 160, which then burns in concert with an oxidizer 170. In some embodiments, fuel 160 may be a triaminoguanidine nitrate (TAG-N) base with flake aluminum powder bound together with a glycidyl azide polymer (GAP). However, any suitable solid rocket fuel(s) may be used without deviating from the scope of the invention. In certain embodiments, oxidizer 170 may include a catalyst that includes, but is not limited to, micron and nanoscale particles of the oxides of Fe, Ni, Cr, Ti, Cu, Bi, Co, Mn, Pd, Pt, Zn, Mg, Ca, rare Earth metals, metal permanganates (alkali, alkali Earth, rare Earth, and transition), chromates, chromites, ferrates, ferrites, metallocenes (e.g., ferrocene, ruthenocene, etc.), substituted metallocenes, or any combination thereof. The fuel and/or oxidizer may be a segmented solid fuel solid oxidizer system (e.g., that of U.S. patent application Ser. No. 15/259,086) or any desired composite monopropellant in some embodiments.

Initially, a decompressive nozzle 180 is set to an active configuration that is appropriate to balance the rate of product mass creation from the burning in combustion chamber 120 with the desired pressure within combustion chamber 120 needed to achieve the desired high impulse burn. Alternatively, decompressive nozzle 180 may be set to a sealed configuration that allows gas to build up in combustion chamber 120. Once sufficient gas pressure builds for ignition, decompressive nozzle 180 may then transition to the active configuration where exhaust gases can escape combustion chamber 120 via decompressive nozzle 180 once the rocket motor is ignited. It should be noted that any suitable decompressive nozzle may be used without deviating from the scope of the invention, so long as the decompressive nozzle is capable of rapidly decompressing the combustion chamber to extinguish the burn and of resetting to the active configuration.

Once a desired impulse is achieved for the current burn, this is detected via a computing system 190 in communication with an accelerometer 192. Computing system 190 is configured to control the operation of electrolyzer 120, igniter 150, and decompressive nozzle 180. In some embodiments, computing system 190 and accelerometer 192, and battery 194 are computing system 1500, accelerometer(s) 1545, and batteries 1540 of FIG. 15.

The dashed box around computing system 190, accelerometer 192, and batteries 194 is intended to indicate that these components are at a different location than what is depicted in FIG. 1 (e.g., in a different location on the solid rocket motor, in an associated space vehicle, etc.). In certain embodiments, computing system 190 may be on the ground or on a different space vehicle, and may communicate with accelerometer 192 and components of system 100 wirelessly.

FIGS. 2A and 2B are side cutaway views illustrating a solid rocket motor 200 with a multiple burn system, according to an embodiment of the present invention. Solid rocket motor 200 includes a rocket body 210 and a combustion chamber 220. Combustion byproducts flow in the direction of the arrow at the center of combustion chamber 220.

A water reservoir 230 provides a base source for hydrogen ($H_2$) and oxygen ($O_2$), which are separated from the water molecules via an electrolyzer 240. Electrolyzer 240 includes electrodes (e.g., electrodes produced via chemical vapor decomposition (CVD)) that are supplied with current from a battery to perform electrolysis. Nonlimiting example embodiments of electrolyzers 400, 500 are shown in FIGS. 4 and 5, respectively. However, any suitable electrolyzer may be used without deviating from the scope of the invention. The separated hydrogen and oxygen are then supplied to an igniter 250 via a hydrogen feed line 252 and an oxygen feed line 254, respectively.

Igniter 250 may be a catalytic igniter (see, e.g., FIGS. 6A and 6B) that recombines the gaseous hydrogen and oxygen on a catalyst bed capable of causing high temperatures and igniting the hydrogen and oxygen. Igniter 250 may also be a spark igniter (see, e.g., FIGS. 7A and 7B) that directly ignites the gaseous hydrogen and oxygen. The igniter should survive the temperatures and pressures of multiple burns (e.g., temperatures of 2,000° C. to 3,000° C. or more and pressures of 700 to 1,500 pounds per square inch (psi) or more). The ignited hydrogen and oxygen then ignite solid fuel 260, which then burns in concert with an oxidizer 270.

Initially, a decompressive extinguishing nozzle, such as decompressive extinguishing plug nozzle 280, is set to an active configuration (or to a sealed configuration before the active configuration that allows gas to build in combustion chamber 220 before transitioning to the active configuration) that is appropriate to balance the rate of product mass creation from the burning in combustion chamber 220 with the desired pressure within combustion chamber 220 needed to achieve the desired high impulse burn. It should be noted that any suitable decompressive extinguishing nozzle may be used without deviating from the scope of the invention, so long as the decompressive extinguishing nozzle is capable of rapidly decompressing combustion chamber 220 to extinguish the burn and of resetting to the active configuration (or to the sealed configuration before the active configuration). The active configuration of decompressive extinguishing plug nozzle 280 is shown in FIGS. 2A and 2B. The sealed configuration appears similar, but decompressive extinguishing plug nozzle 280 is sealed instead of allowing gas to flow out.

Once a desired impulse is achieved for the current burn, this is detected via a computing system 290 in communication with an accelerometer 292. Computing system 290 is configured to control the operation of electrolyzer 240, igniter 250, and decompressive extinguishing nozzle 280. In some embodiments, computing system 290 and accelerometer 292 are computing system 1500 and accelerometer(s) 1545 of FIG. 15. The dashed box around computing system 290 and accelerometer 292 is intended to indicate that these components are at a different location than what is depicted in FIGS. 2A and 2B (e.g., in a different location on solid rocket motor 200, in an associated space vehicle, etc.). In certain embodiments, computing system 290 may be on the ground or on a different space vehicle, and may communicate with accelerometer 292 and components of rocket engine 200 wirelessly.

Computing system 290 extinguishes solid rocket motor 200 by controlling decompressive extinguishing plug nozzle 280 to cause a rapid decompression of the combustion chamber. In FIG. 2A, a plug 281 of a decompressive extinguishing plug nozzle 280 is fixed and an outer cowl 286 is movable, whereas in FIG. 2B, outer cowl 286 is fixed and plug 281 is movable. In FIG. 2A, cowl 286 is a single unit, forming both a cowl and cowl housing. However, in some embodiments, the cowl and cowl housing are separate, but attached, components. With reference to FIG. 2A, decompressive extinguishing plug nozzle 280 in this embodiment includes a plug 281 housed within a plug housing 284 inside rocket body 210. Plug 281 includes a plug seal 282 that seals plug 281 from combustion chamber 220, with the exception of holes 283 in plug seal 282 that allow exhaust to escape combustion chamber 220.

Decompressive extinguishing plug nozzle 280 includes a plug ring 285 surrounding a bottom portion of plug 281 and outer cowl 286 that surrounds plug ring 285 and contacts plug housing 284. In some embodiments, plug seal 282 and outer cowl 286 are a single uniform component. Outer cowl 286 is movable via movement mechanisms 287 to increase the volume of a mechanically variable throat 288. Portions of plug ring 285 and/or outer cowl 286 contacting or coming proximate to plug housing 284 may be coated in a dampening material, as may corresponding portions of plug housing 284. The dampening material cushions the impact of contacting portions of these components when decompressive extinguishing plug nozzle 280 transitions from the active configuration to the decompressive configuration. Additionally or alternatively, this dampening could be accomplished via springs.

The volume surrounding plug 281 and defined by plug 281, plug housing 284, plug ring 285, and outer cowl 286 provides a mechanically variable throat 288. Movement mechanisms 287 could be electrical, mechanical, hydraulic, electromechanical, magnetic, and/or any other suitable mechanism to facilitate movement without deviating from the scope of the invention. For example, electromagnet(s) could be deenergized to permit outer cowl 286 to be moved out by the internal combustion pressure.

After decompression, decompressive extinguishing plug nozzle 280 may be returned to the active or sealed configuration by returning outer cowl 286 to its original position via movement mechanisms 287. Computing system 290 may then initiate another burn at some point. Computing system 290 may then activate electrolyzer 240 to produce more hydrogen and oxygen gas and then ignite the hydrogen and oxygen gas by controlling igniter 250. The solid rocket motor would then burn yet again.

Pressure sensors 222 (e.g., pressure transducers) are included within combustion chamber 220 to detect pressure. In certain embodiments, one or more such sensors may be included in decompressive extinguishing plug nozzle 280. Using pressure sensors 222, software running on computing system 290 monitors the current pressure during the burn. Should the pressure go too high or deviate significantly from the expected pressure profile, an auto abort command may be initiated to open outer cowl 286 and decompress combustion chamber 220. Decompressive extinguishing plug nozzle 280 may then be returned to the active or sealed configuration. By having a mechanism like decompressive extinguishing plug nozzle 280 to rapidly open mechanically variable throat 288, an overpressure or runaway pressure event may be alleviated to avoid the rocket blowing up.

With reference to FIG. 2B, decompressive extinguishing plug nozzle 280 in this embodiment includes plug 281 housed within plug housing 284. Plug 281 includes plug seal 282 that seals plug 281 from combustion chamber 220, with the exception of holes 283 in plug seal 282 that allow exhaust to escape combustion chamber 220.

Decompressive extinguishing plug nozzle 280 includes plug ring 285 surrounding an upper part of a flared portion of plug 281 and outer cowl 286 that surrounds plug ring 285 and contacts plug housing 284. In some embodiments, plug seal 282, plug housing 284, and/or cowl 286 are a single uniform component. Plug 281 is movable via movement mechanism 287 to provide a choked flow in the depicted active configuration, and to decompress combustion chamber 220 in the decompressive configuration. The decompressive configuration increases the volume of mechanically variable throat area 288. The volume surrounding plug 281 and defined by plug 281, plug housing 284, and plug ring 285 provides a mechanically variable throat area 288. Further details regarding some embodiments of decompressive extinguishing plug nozzle 280 may be found in U.S. Provisional Patent Application No. 62/879,783.

Figure 3:
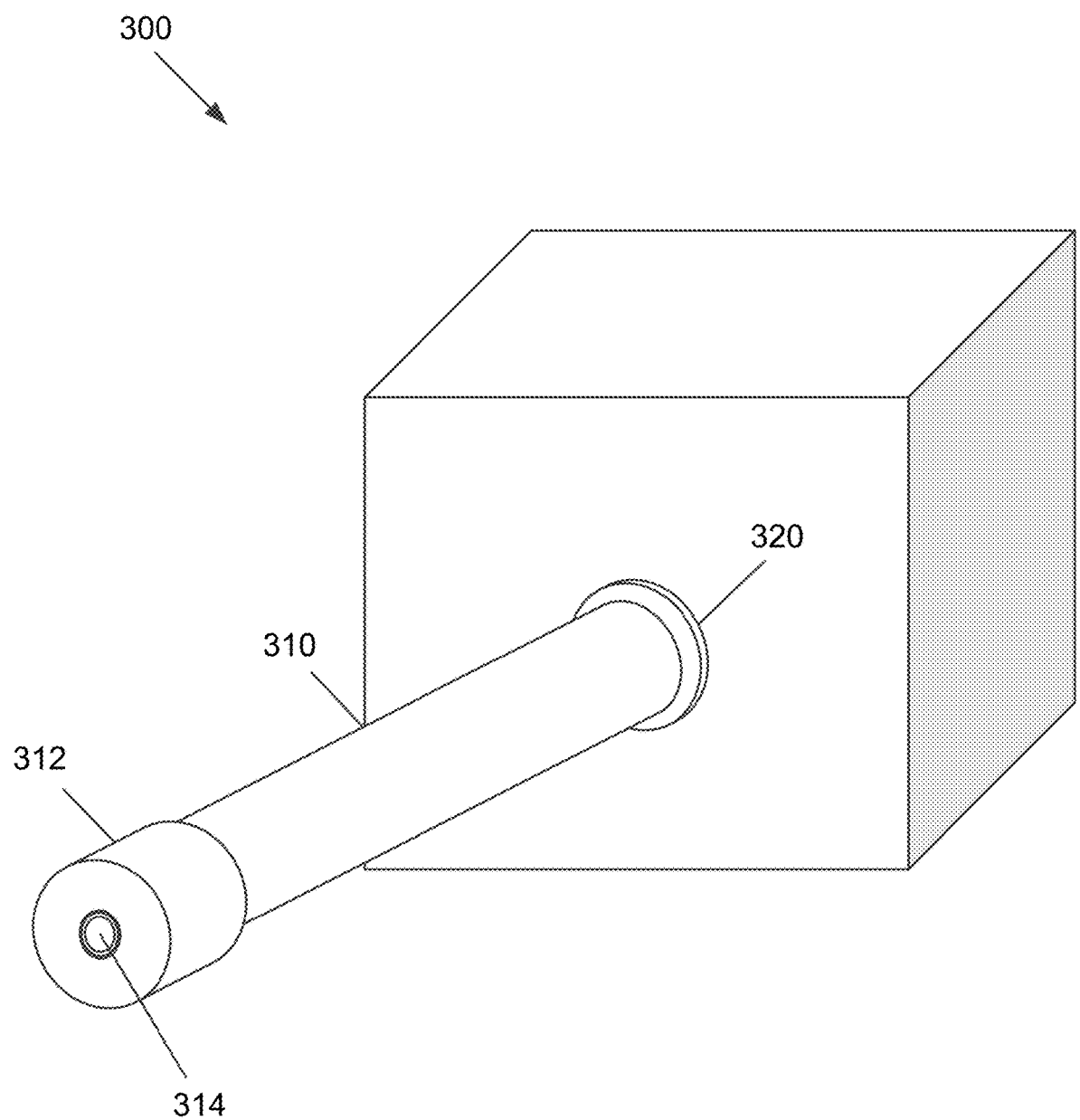
FIG. 3 is a perspective view illustrating a CubeSat with a solid rocket motor capable of multiple burns, according to an embodiment of the present invention.

FIG. 3 is a perspective view illustrating a CubeSat 310 with a solid rocket motor 310 capable of multiple burns, according to an embodiment of the present invention. In some embodiments, solid rocket motor 310 may be solid rocket motor 200 of FIG. 2A. It should also be noted that instead of a CubeSat, solid rocket motor may be integrated with any desired manned or unmanned terrestrial or space vehicle without deviating from the scope of the invention.

Solid rocket motor 310 includes an outer cowl 312 and a nozzle 314. Solid rocket motor is also movable via a gimbaled actuator 320 so thrust can be oriented in a range of directions. In some embodiments, at least one solid rocket motor 310 may be located on a different side of CubeSat 300 in order to provide thrust in various directions. Any desired number of solid rocket motors may be affixed to one or more sides without deviating from the scope of the invention.

The use of solid rocket motors for space vehicles has the advantage of facilitating rapid insertion into the desired orbit(s). For instance, a constellation of CubeSats could be deployed from a dispenser to their respective orbits in a matter of days. Also, space vehicles could be moved to different orbits to avoid other space vehicles or debris fields. Space vehicles could also be deorbited on command, and if large enough that debris will strike the ground after reentry, solid rockets could be used to deorbit the vehicle to a relatively safe and unpopulated location, such as non-shipping lane areas of the Pacific Ocean.

FIG. 4 illustrates an electrolyzer 400, according to an embodiment of the present invention. In some embodiments, electrolyzer 400 may be electrolyzer 120 of FIG. 1 or electrolyzer 240 of FIGS. 2A and 2B. Electrolyzer 400 includes a water reservoir and an anode 420 located between a PEM 430 and water reservoir 420. In some embodiments, water reservoir 410 may be water reservoir 230 of FIGS. 2A and 2B. Alternatively, water may be supplied to water reservoir 410 by an external water tank, such as water tank 110 of FIG. 1.

A cathode 440 is located on the side of PEM 430 opposite anode 420. When a direct current (DC) voltage is applied to anode 420 and cathode 440 via a power supply unit (PSU) 460, water in water reservoir 410 is oxidized to oxygen and protons (H+). The protons pass through PEM 430 to cathode 440 (also known as a hydrogen electrode), and the protons are reduced to hydrogen gas in hydrogen chamber 450, obtaining electrons. Oxygen ($O_2$) and hydrogen ($H_2$) are then output from electrolyzer 400 via oxygen feed line 470 and hydrogen feed line 480, respectively.

Electrolyzer 400 is a single cell electrolyzer. However, multi-cell electrolyzers may also be used. A dual cell electrolyzer 500 is shown in FIG. 5. Dual cell electrolyzer 500 includes a wet cell 510 and a dry cell 520. Wet cell 510 and dry cell 520 are supplied with a voltage from a power source 530.

Wet cell 510 includes a PEM electrolyzer 512 and two water plenums 514 at opposite ends of electrolyzer 512. Water from water plenums 514 is fed into electrolyzer 512, where water is converted to $2e^-+2H^++\frac{1}{2}O_2$ on the anode side. On the cathode side, $2e^-+2H^+$ is converted to $H_2$. Due to the liquid water in wet cell 510, the product $H_2$ and $O_2$ gases are "wet" in that they become humidified and may possibly contain entrained water droplets. The oxygen from PEM electrolyzer 512 flows to the anode side of dry cell 520 via wet oxygen line 540, and flow of oxygen is controlled by a valve 542. The hydrogen from PEM electrolyzer 512 flows to the cathode side of dry cell 520 via wet hydrogen line 550, and flow of hydrogen is controlled by a valve 552.

A PEM electrolyzer 522 of dry cell 520 adsorbs the water from the wet $H_2$ and $O_2$ gas streams and converts the water to additional $H_2$ and $O_2$, thus "drying" the product gasses and increasing the $H_2$ and $O_2$ yield of the water from water reservoir 420. Dry oxygen and dry hydrogen is output to dry oxygen feed line 560 and dry hydrogen feed line 570. Flow of gas in dry oxygen feed line 560 and dry hydrogen feed line 570 is controlled by valves 562, 572, respectively.

FIGS. 6A and 6B illustrate a catalytic igniter 600, according to an embodiment of the present invention. Catalytic igniter 600 is fed independently by a gaseous hydrogen feed line 610 and a gaseous oxygen feed line 620. A portion of gaseous hydrogen feed line 610 and gaseous oxygen feed line 620 are surrounded by a feed line housing 660 (see FIG. 6B). This protects a portion of feed lines 610, 620 from exposure to combustion chamber 650.

Near where feed lines 610, 620 enter a combustion chamber 650, they include independent ball bearing ("BB") style backflow prevention valves 630. In BB style backflow prevention valves 630, gas can flow freely in one direction (i.e., towards combustion chamber 650). However, when the gas flows in the opposite direction, the BB is pushed up against a hole, stopping the flow of gas.

Gaseous hydrogen feed line 610 and gaseous oxygen feed line 620 then independently extend into combustion chamber 650 to the point where they are combined coincident with a catalyst bed 640 (e.g., a catalyst pellet bed that includes ~10% iridium on alumina) near to the primary propellant (not shown). To ignite the solid rocket motor, the following sequence occurs: (1) igniter 600 is fed by gaseous hydrogen feed line 610 and gaseous oxygen feed line 620, which receive hydrogen and oxygen, respectively, from an internal source (e.g., storage tanks, an electrolyzer, etc.); (2) the pressure from the feed of gaseous hydrogen and oxygen opens respective backflow valves 630; (3) the gases flow independently to catalyst bed 540, where they combine on catalyst bed 640 at stoichiometric proportions; (4) the temperature of catalyst bed 640 raises to the flash point temperature of a stoichiometric hydrogen and oxygen mixture (e.g., approximately 850° C. on the surface at atmospheric pressure at Los Alamos National Laboratory for an experiment); (5) after the flash ignition event, a sustained flame occurs at the point of hydrogen/oxygen mixing (i.e., at the tip of gaseous hydrogen feed line 610 and gaseous oxygen feed line 620 within combustion chamber 650; (6) this flame ignites the propellant; and (7) as the chamber pressure rises to become greater than the feed pressure, backflow prevention valves 630 seal gaseous hydrogen feed line 610 and gaseous oxygen feed line 620 from combustion chamber 650.

It may be beneficial to use a catalyst bed material that is not significantly poisoned by combustion chamber products. Also, the catalyst should survive most realistic combustion chamber pressures and temperatures. Therefore, the system of some embodiments is completely reusable for many burns to many (e.g., dozens or more).

Typically, ignition systems for solid rockets are single-use igniters that employ pyrotechnics, hypergolic liquids, or other hazardous materials. However, the ignition systems of some embodiments employ relatively benign materials (e.g., steel, aluminum, aluminum oxide, and iridium). Such materials are suitable for launch rideshare, for example. Whereas liquid fuel rockets have used catalytic igniters, these igniters are complex in their approach to achieving stoichiometric mixture burning of hydrogen and oxygen. The complexity arose from preventing "flashback" and improving the life of the igniter to often extremely long times (e.g., a common approach was to ignite a hydrogen rich mixture and bring the flame products to stoich downstream of the catalyst). However, some embodiments employ a novel and relatively straightforward approach to this problem in that mixing occurs only in the catalyst bed and is stoichiometric at that point.

Rather than a catalytic igniter, some embodiments employ a spark igniter. Such a spark igniter 700 is shown in FIGS.

7A and 7B. Spark igniter 700 includes a wire 710 that can carry a current and cause a spark at the end closest to gaseous hydrogen feed line 720 and gaseous oxygen feed line 730. The spark then ignites the gaseous hydrogen and oxygen, which ignites rocket fuel (not shown).

Catalytic or spark igniters of some embodiments, such as those depicted in 6A-7B, may be suitable for a variety of rockets. Such igniters may provide a relatively simple, safe, and reusable ignition system. Such embodiments may also improve the safety and environmental friendliness of arming and ignition, which provides a significant advantage.

Figure 8A:
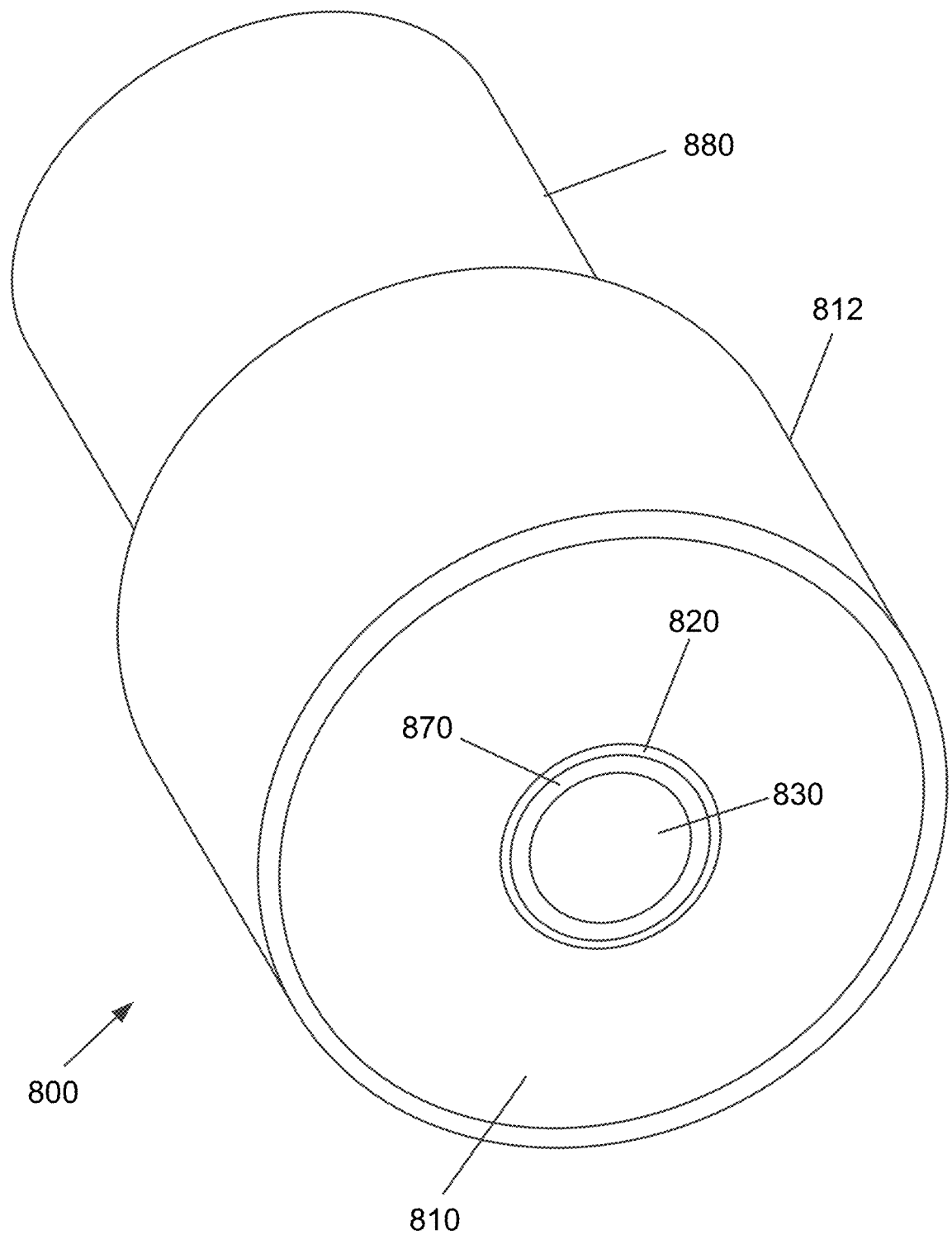
FIG. 8A a perspective view illustrating a decompressive extinguishing plug nozzle in an active configuration, according to an embodiment of the present invention.
Figure 8B:
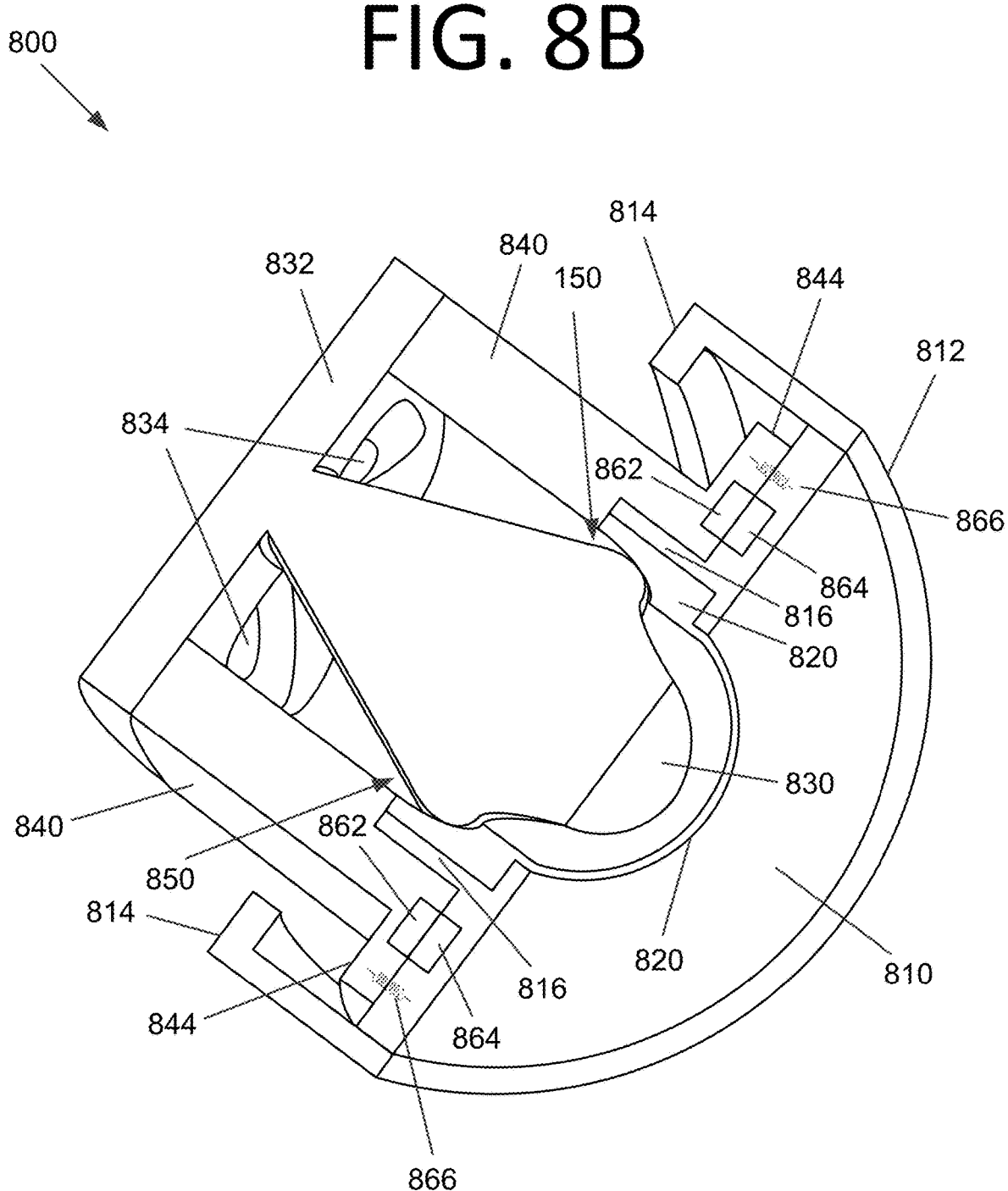
FIG. 8B is a cutaway perspective view illustrating the decompressive extinguishing plug nozzle in a sealed configuration, according to an embodiment of the present invention.

FIGS. 8A and 8B illustrate an embodiment of a decompressive extinguishing plug nozzle 800 in an active or sealed configuration. Decompressive extinguishing plug nozzle 800 is attached to a rocket body 880 and includes an outer cowl 810, a cowl housing 812, a plug ring 820, and a plug 830. In some embodiments, cowl 810 and cowl housing 812 are formed as one integral piece. Collectively, plug ring 820 and plug 830 provide an aerospike nozzle due to the shape and position of plug 830 with respect to plug ring 820. In a sealed configuration (i.e., when gas is being built up inside a combustion chamber 890), plug 830 and outer cowl 810 collectively impede the nozzle defined by plug ring 820 and seal combustion chamber 890 (see FIG. 8E) since springs 866 bias decompressive extinguishing plug nozzle 800 closed.

Once sufficient pressure builds in combustion chamber 890, the force generated by springs 866 is overcome by the gas pressure and outer cowl 810 is pushed slightly away such that plug 830 no longer completely impedes the nozzle, and rocket exhaust is able to pass around plug 830 and out through plug ring 820 via a gap 870. The decompressive extinguishing plug nozzle is now in the active configuration and ready for the rocket motor to be ignited. Since plug 830 and plug ring 820 are in the flow of the hot exhaust and may be subjected to temperatures of 2,000° C. to 3,000° C. or more, plug 830 and plug ring 820 are constructed from a high temperature-compatible material, such as graphite, boron carbide, ceramics, etc.

It should be noted that for atmospheric flight where air is available, springs 866 may not be included and decompressive extinguishing plug nozzle 800 may lack a sealed configuration. However, where only space flight or both atmospheric and reignited space flight are planned, the sealed configuration may be beneficial. This is because combustion gases are allowed to build in the combustion chamber, which allows the rocket motor to burn for the first time in space, or to burn again in space after being extinguished.

Decompressive extinguishing plug nozzle 800 includes a plug housing 840 that houses plug 830. Plug housing 840 is connected to plug 830 via plug seal 832. Plug seal 832 also seals against the inside of rocket body 880 around its peripheral edges, located downstream from a combustion chamber 890 (see FIG. 8E). Plug seal 832 has passages 834 that allow exhaust to flow around plug 830 through plug housing 840 and plug ring 820, and then out of the nozzle defined by plug ring 820. In some embodiments, in addition to or in lieu of springs 866, passages 834 may be vents that can close to put decompressive extinguishing plug nozzle 800 in the sealed configuration and open to put decompressive extinguishing plug nozzle 800 in the active configuration.

The volume surrounding plug 830 and defined by plug 830, plug housing 840, and outer cowl 810 provides a mechanically variable throat 850. Mechanically variable throat 850 defines the sonic "choked" flow. In the "activated" configuration in some embodiments, mechanically variable throat 850 is appropriate to balance the rate of product mass creation from the burning in combustion chamber 890 with the desired pressure within combustion chamber 890 needed to achieve a high specific impulse burn. For instance, pressures may be 500 to 2,000 pounds per square inch (psi) or more in some embodiments. Movement mechanisms 860 (see FIG. 8E) include a plug housing portion 862 and an outer cowl portion 864 that hold outer cowl 810 and a portion of plug ring 820 against a lip 844 of plug housing 840, as well as next to a plug ring guard 816. In some embodiments, movement mechanisms 860 are controlled by a computing system, such as computing system 1500 of FIG. 15. In certain embodiments, accelerometers, such as accelerometer(s) 1545 of computing system 1500, are included in one or more locations on the rocket to determine acceleration characteristics. Movement mechanisms 860 could be electrical, mechanical, hydraulic, electromechanical, magnetic, and/or any other suitable mechanism to facilitate movement without deviating from the scope of the invention. For example, the polarity of the electromagnet(s) could be reversed to drive them apart and permit outer cowl 810 to be moved out by a combination of this force and the internal combustion pressure. Keeping the electromagnet(s) reversed after the rocket motor is extinguished may overcome the force of springs 866 to keep the decompressive configuration maintained. However, where no sealed configuration is needed, or it is desired for decompressive extinguishing plug nozzle 800 to return to the sealed configuration immediately after the rocket motor is extinguished, the electromagnet(s) could simply be deenergized.

This movement forced by the combustion pressure is a novel aspect of some embodiments. After extinguishing the fuel, the polarity of the electromagnet(s) could then be reversed to draw outer cowl and plug housing 840 together, returning decompressive extinguishing plug nozzle 800 to the active configuration or sealed configuration. In some embodiments, springs 866 may have sufficient strength to seal decompressive extinguishing plug nozzle. It should be noted that any desired number and/or types of movement mechanisms may be used without deviating from the scope of the invention.

Figure 8C:
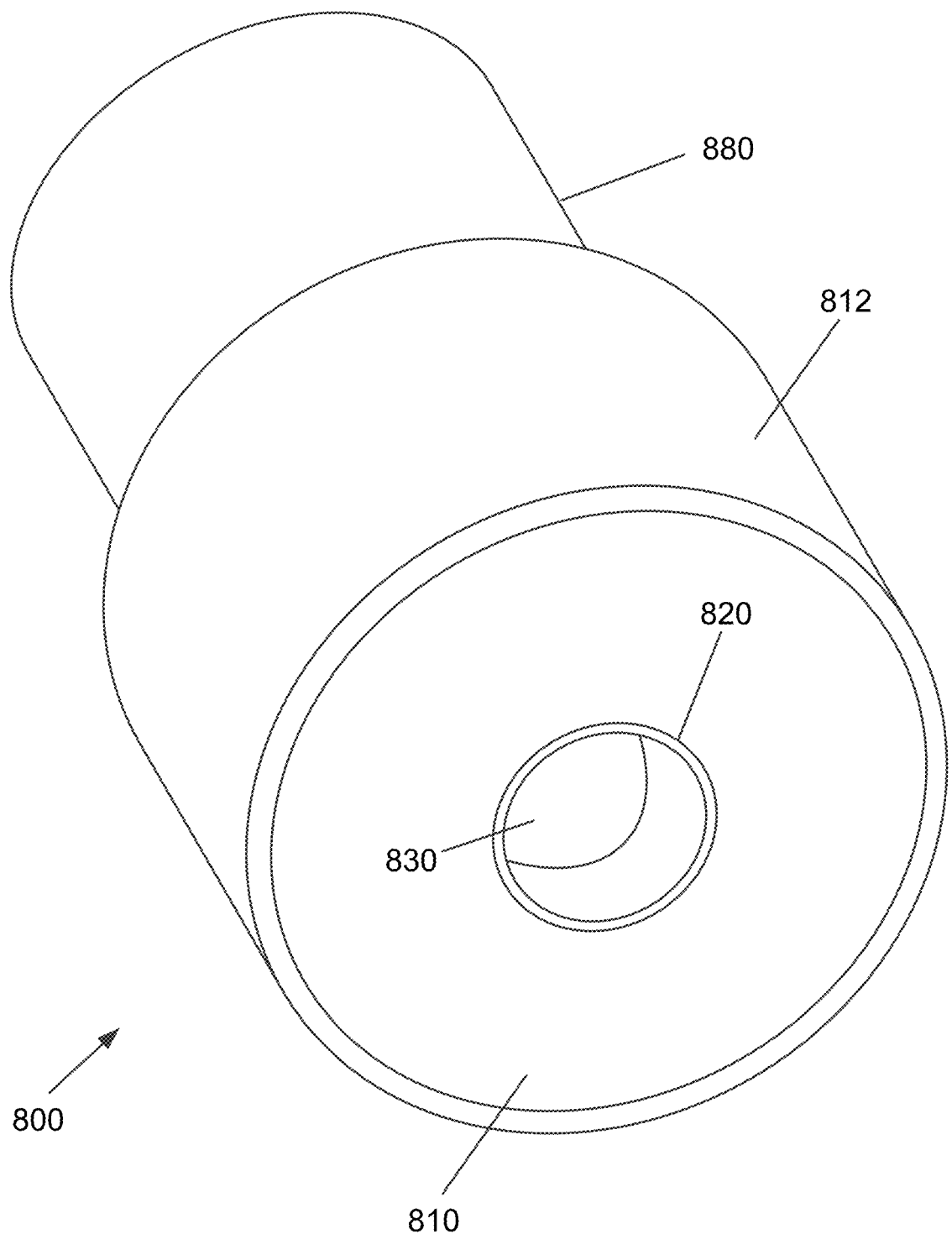
FIG. 8C a perspective view illustrating the decompressive extinguishing plug nozzle in a decompressive configuration, according to an embodiment of the present invention.
Figure 8D:
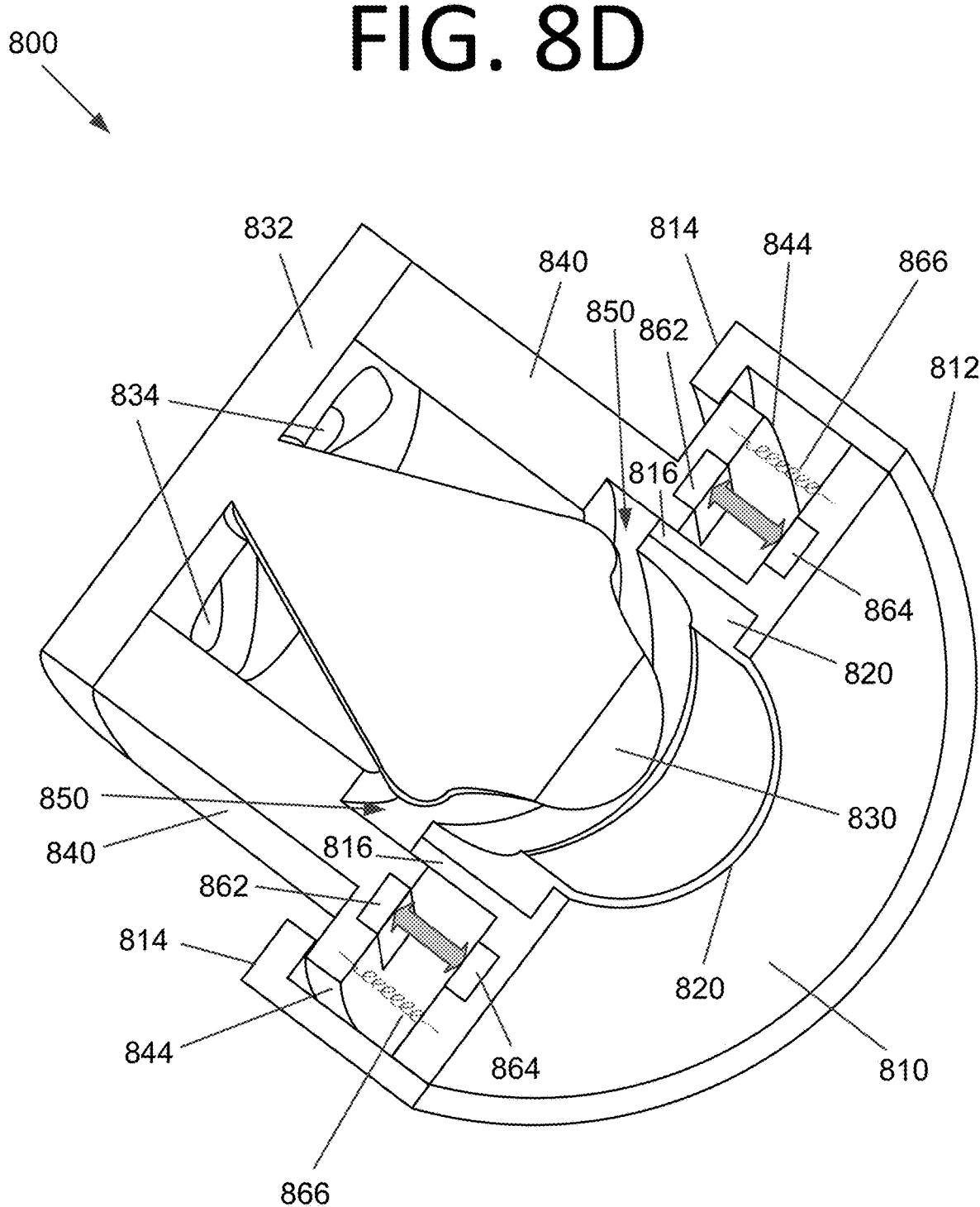
FIG. 8D is a cutaway perspective view illustrating the decompressive extinguishing plug nozzle in the decompressive configuration, according to an embodiment of the present invention.

FIGS. 8C and 8D illustrate decompressive extinguishing plug nozzle 800 in a decompressive configuration. To transition from the active configuration to the decompressive configuration, movement mechanisms 860 create separation between outer cowl 810/cowl housing 812 and plug housing 840, as denoted by the gray arrows in FIG. 8D. This separation could be created by deenergizing electromagnets, activating actuators, extending rods via hydraulic mechanisms, any combination thereof, etc.

When in the decompressive configuration due to a rapid separation between outer cowl 810/cowl housing 812 and plug housing 840, a sudden drop in pressure occurs in mechanically variable throat 850. In some embodiments, the decompression rates may be 50 kilopounds per square inch (ksi) per second or greater. This rapid decompression occurs in combustion chamber 890 as well via passages 834 and extinguishes the rocket motor. It should be noted that in some embodiments, lip 844 moves vertically past extension 816, forming a gap that exposes outside air or space to the interior of plug housing 840. This may drop the pressure even further, facilitating more rapid extinguishing of the rocket motor.

Figure 8E:
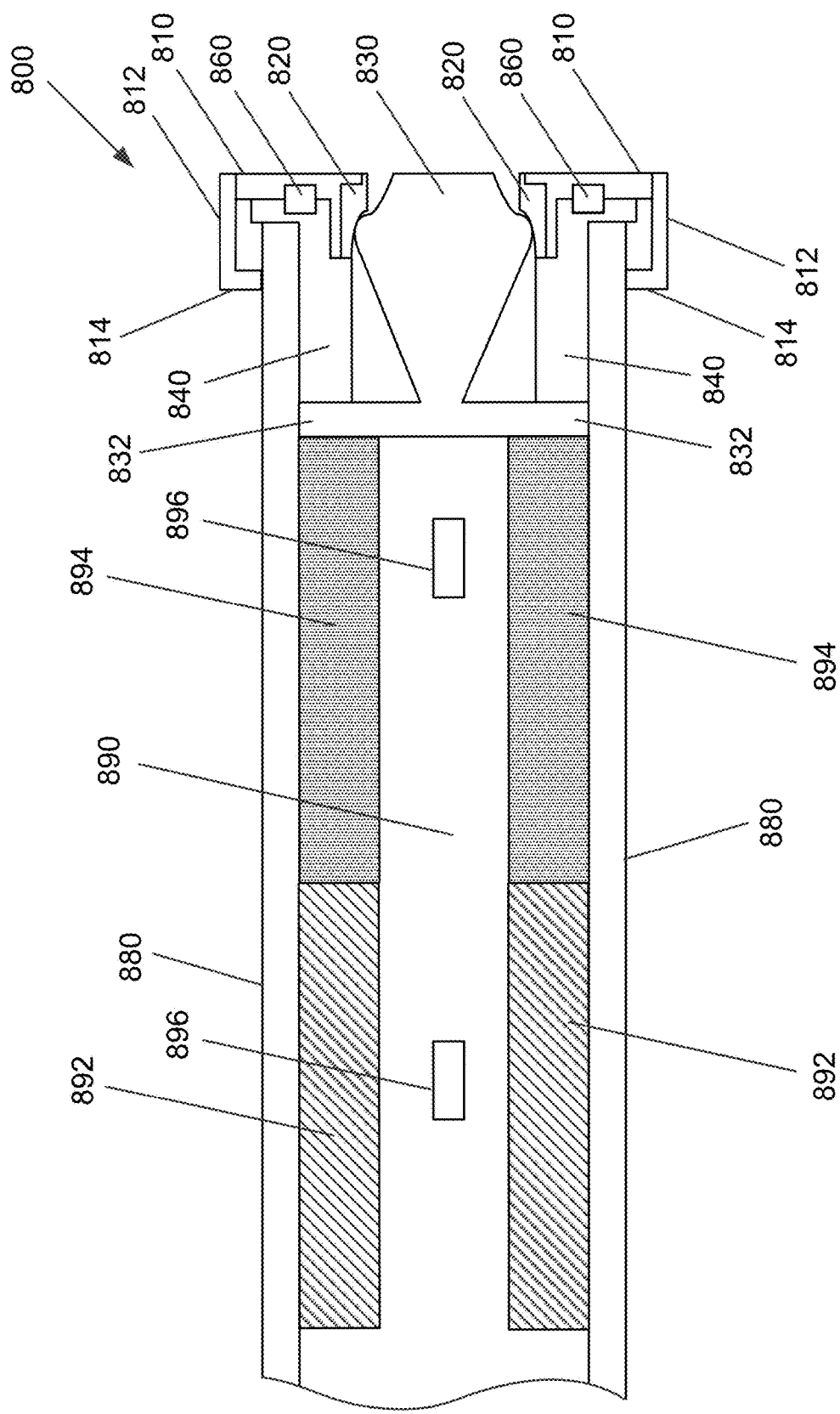
FIG. 8E is a side cutaway view illustrating the bottom portion of a rocket with a decompressive extinguishing plug nozzle, according to an embodiment of the present invention.

FIG. 8E is a side cutaway view illustrating the bottom portion of a rocket with decompressive extinguishing plug nozzle 810, according to an embodiment of the present invention. Combustion chamber 890 is surrounded by fuel 892 and an oxidizer 994 that provides oxygen so fuel 892 can combust fully at all altitudes. However, it should be noted that more traditional composite monopropellants, such as ammonium perchlorate, may be used. Indeed, the decompressive concept will work for any solid rocket fuel in some embodiments.

Pressure sensors 896 (e.g., pressure transducers) are included within combustion chamber 890 to detect pressure. In certain embodiments, one or more such sensors may be included in decompressive extinguishing plug nozzle 800. Using pressure sensors 896, software running on a computing system (e.g., computing system 1500 of FIG. 15) monitors the current pressure during the burn. Should the pressure go too high or deviate significantly from the expected pressure profile, an auto abort command may be initiated to open outer cowl 810 and decompress combustion chamber 890. Decompressive extinguishing plug nozzle 800 may then be returned to the active or sealed configuration. By having a mechanism like decompressive extinguishing plug nozzle 800 to rapidly open mechanically variable throat 850, an overpressure or runaway pressure event may be alleviated to avoid the rocket blowing up.

Lip 814 of cowl housing 812 contacts the outside of rocket body 880. Plug housing 840 is sealed against the end and inside of rocket body 880. Plug seal 832 also seals against the inside of rocket body 880. As such, in this embodiment, it is outer cowl 810/cowl housing 812, and by extension, plug ring 820, that are movable via movement mechanism 860.

Figure 9:
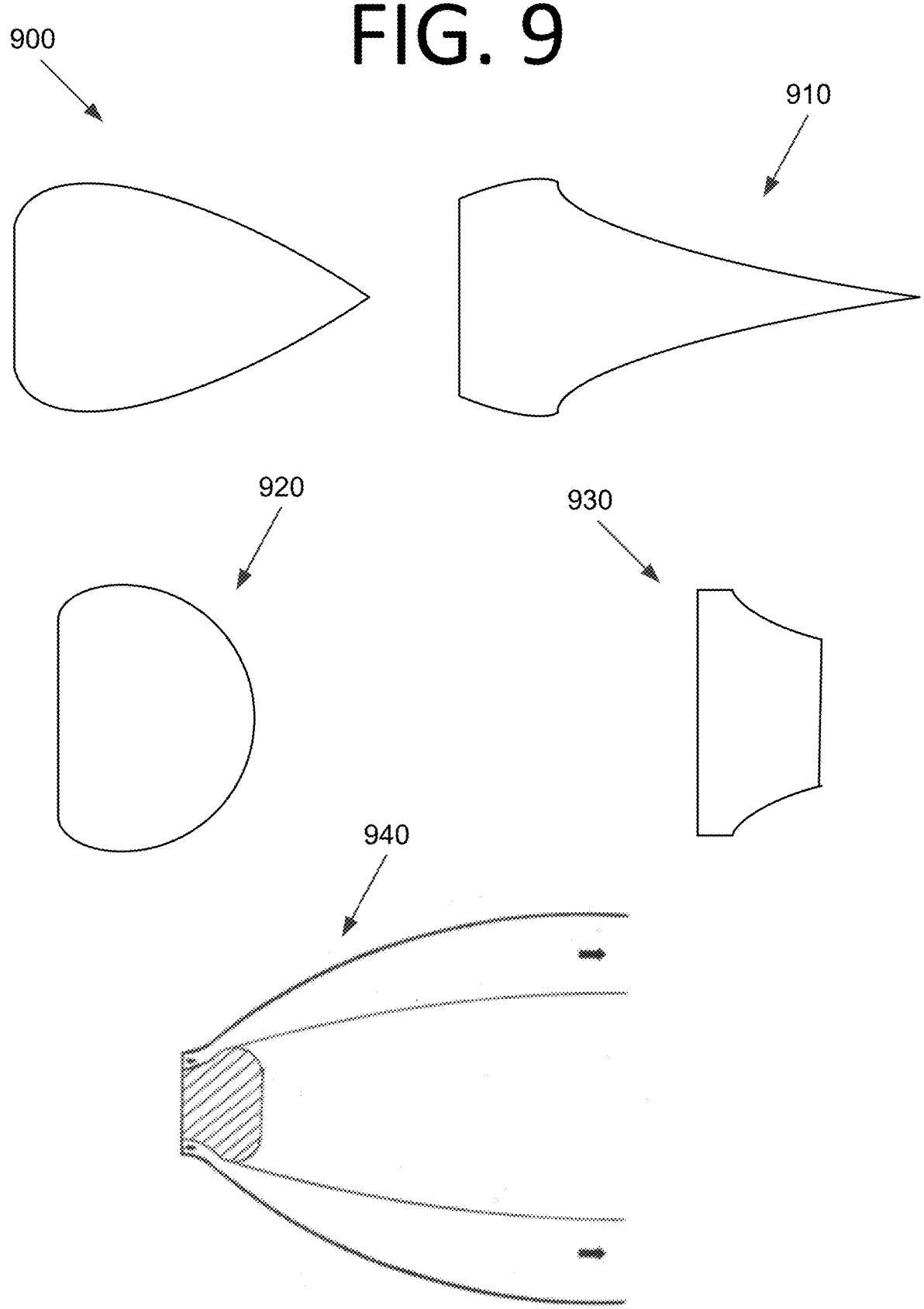
FIG. 9 illustrates some example plug designs, according to an embodiment of the present invention.

FIG. 9 illustrates some example plug designs, according to an embodiment of the present invention. Plugs 900, 910, 920, 930 may be substituted for plug 830 of FIGS. 1A-E in some embodiments. However, any suitable plug shape may be used without deviating from the scope of the invention. In some embodiments, such as nozzle system 940, the rocket may have a bell-shaped nozzle with a decompressive extinguishing plug nozzle. Any rocket nozzle and plug type is contemplated within the scope of the present invention, so long as the fuel can be extinguished via rapid decompression.

In some embodiments, the plug may be movable instead of the outer cowl. In such embodiments, a feature on a wall side may be included to set the mechanically variable throat area. A plug behind a cowl inside the vehicle may be moved in or a plug outside the vehicle after an aperture (i.e., a nozzle) may be moved out. If similar to nozzle system 940 of FIG. 9, for example, moving the plug itself may make more sense to facilitate decompression.

Figure 10A:
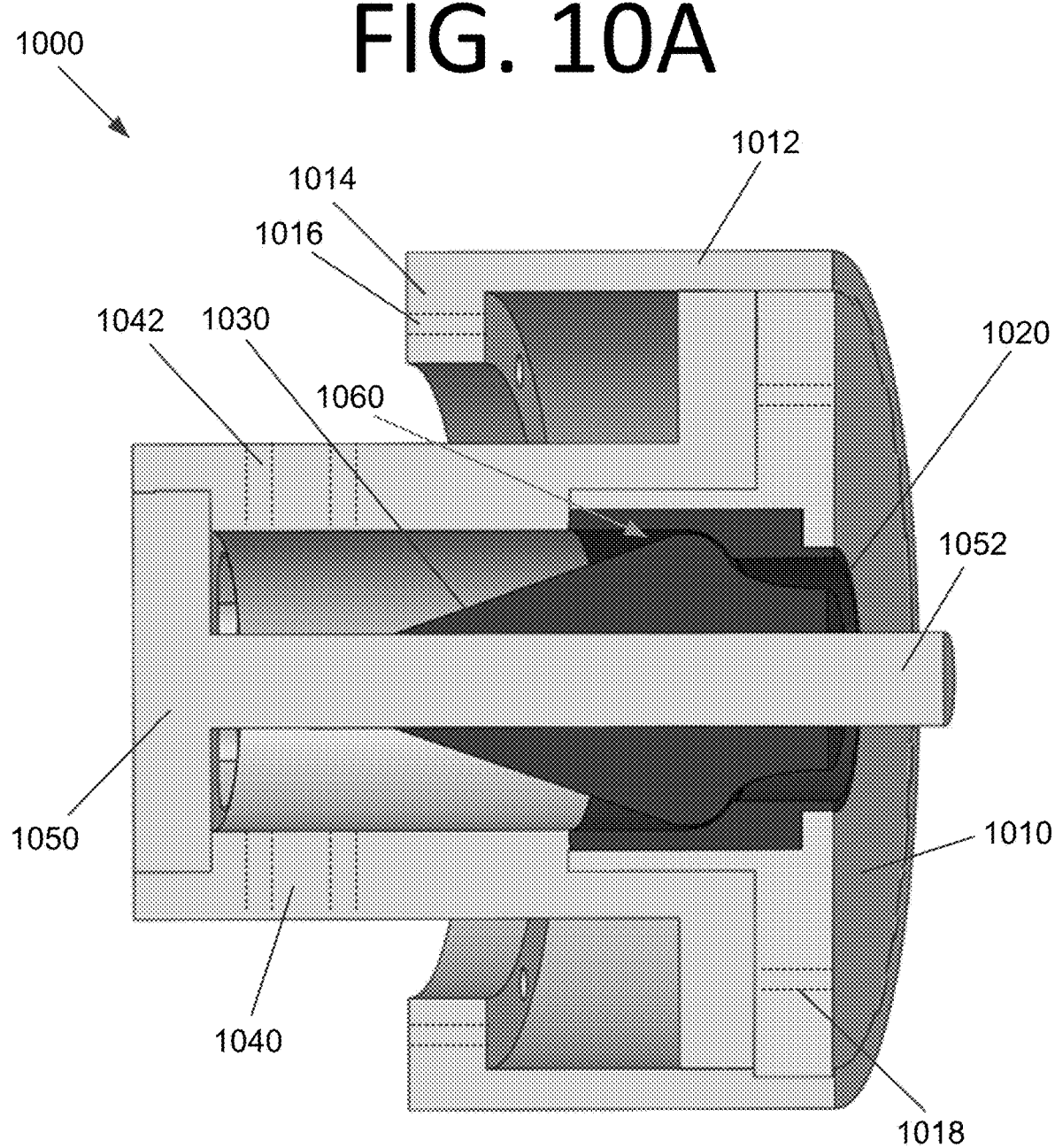
FIG. 10A is a side cutaway view illustrating a decompressive extinguishing plug nozzle in an active configuration, according to an embodiment of the present invention.

FIG. 10A is a side cutaway view illustrating a decompressive extinguishing plug nozzle 1000 in an active configuration, according to an embodiment of the present invention. It should be noted that in some embodiments, decompressive extinguishing plug nozzle 1000 incorporates one, some, or all of the features from FIGS. 8A-E that are unlabeled and/or non-illustrated in FIGS. 10A and 10B. In certain embodiments, decompressive extinguishing plug nozzle 1000 is also configured to have a sealed configuration so gas pressure can build in the combustion chamber prior to ignition.

As with decompressive extinguishing plug nozzle 800 of FIGS. 8A-E, decompressive extinguishing plug nozzle 1000 includes a cowl 1010, a cowl housing 1012, a plug ring 1020, a plug 1030, a plug housing 1040, and a mechanically variable throat 1060. However, in this embodiment, rather than being attached to a plug seal, plug 1030 is attached to a rod 1052 of a seal 1050 that extends through plug 1030. The mechanism for moving decompressive extinguishing plug nozzle 1000 is not shown herein. However, any suitable mechanism may be used without deviating from the scope of the invention.

In this embodiment, rod 1052 was included for structural reasons. If plug 1030 is made from a solid piece of graphite, for example, the graphite is quite brittle. Vibrations in decompressive extinguishing plug nozzle 1000 may cause failure in the neck of plug 1030 near seal 1050. Accordingly, including a rod 1052 that is designed for flexibility and robustness under vibration (e.g., steel, aluminum, etc.) alleviates this problem. Such a feature may work for plugs of any size and/or type, including for static nozzles.

Figure 11B:
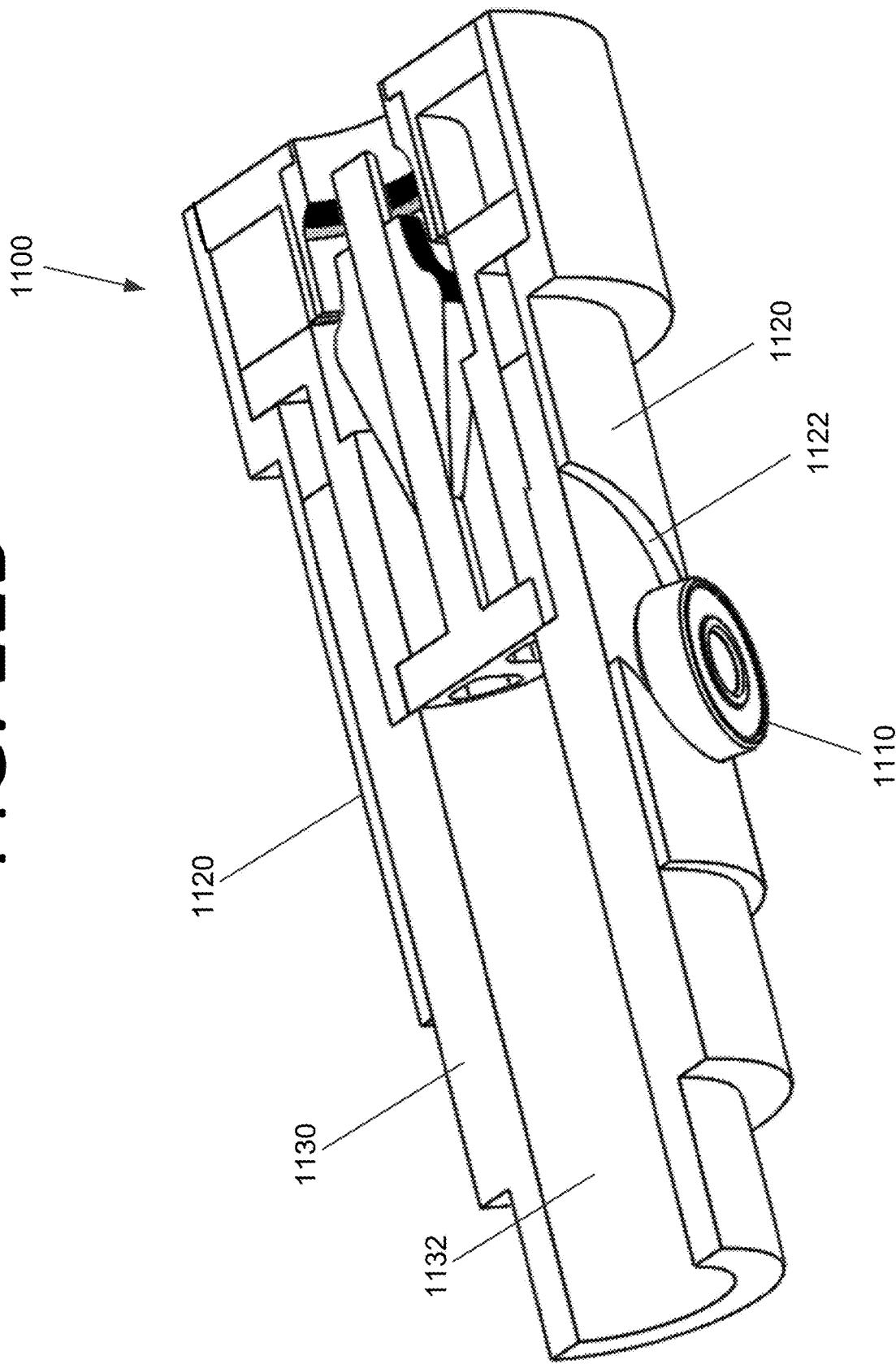
FIG. 11B is a perspective cutaway view illustrating the decompressive extinguishing plug nozzle in a decompressive configuration, according to an embodiment of the present invention.

Decompressive extinguishing plug nozzle 1000 can also be moved into a decompressive configuration, as shown in FIG. 11B. In the decompressive configuration, plug 1030 and rod 1052 remain fixed in this embodiment while cowl 1010/cowl housing 1012 move. This increases the area of mechanically variable throat 1060 and causes rapid decompression, extinguishing the burning solid rocket fuel in the combustion chamber.

In some embodiments, passages 1042 to vent out transverse to the direction of travel and/or passages 1016 in lip 1014 may be provided. Additionally or alternatively, in certain embodiments, passages 1018 may be included in cowl 1010 to ensure that gasses that are unintentionally vented into the volume between cowl 1010 and plug housing 1040 can easily leave. It should be noted that such passages may also be included in decompressive extinguishing plug nozzle 800 of FIGS. 8A-E, for example.

FIGS. 11A-F illustrate a decompressive extinguishing plug nozzle 1100, according to an embodiment of the present invention. Decompressive extinguishing plug nozzle utilizes wheel bearings 1110 (e.g., wheels) sitting on shelves 1122 that are formed in a cowl housing 1120. Any desired number, size, shape, and/or location of wheels and shelves may be used without deviating from the scope of the invention. Shelves 1122 define tracks along which wheel bearings 1110 may roll along the edges of respective shelves 1122.

In this embodiment, wheel bearings 1110 are attached to a rocket body 1130. Rocket body 1130 also defines a combustion chamber 1132 within. A portion of cowl housing 1120 surrounds rocket body 1130. The remaining components of extinguishing plug nozzle 1100 that are in this embodiment are housed within cowl housing 1120 are the same as those shown in FIGS. 11A and 11B. However, any suitable extinguishing plug nozzle design may be housed therein without deviating from the scope of the invention.

In FIGS. 11A, 11C, and 11E, decompressive extinguishing plug nozzle 1100 is in the active configuration. In some embodiments, decompressive extinguishing plug nozzle 1100 is also configured to have a sealed configuration so gas pressure can build in the combustion chamber prior to ignition. When in the active configuration, shelves 1122 translate the large force along the motor thrust axis to wheel bearings 1110 in the form of a relatively small torque for ease of retention. Some embodiments, such as that depicted in FIGS. 11A-F, may be made with very low mass, which is beneficial for space applications. This is a novel aspect of some embodiments.

To move to the decompressive configuration, as shown in FIGS. 11B, 11D, and 11F, a solenoid (not shown) may be used to cause cowl housing 1120 and wheel bearings 1110 to rotate. Alternatively, shelves 1122 may have an incline such that when a pin (not shown) is pulled, the pressure from the burning fuel naturally drives the rotation and decompression.

Figure 12A:
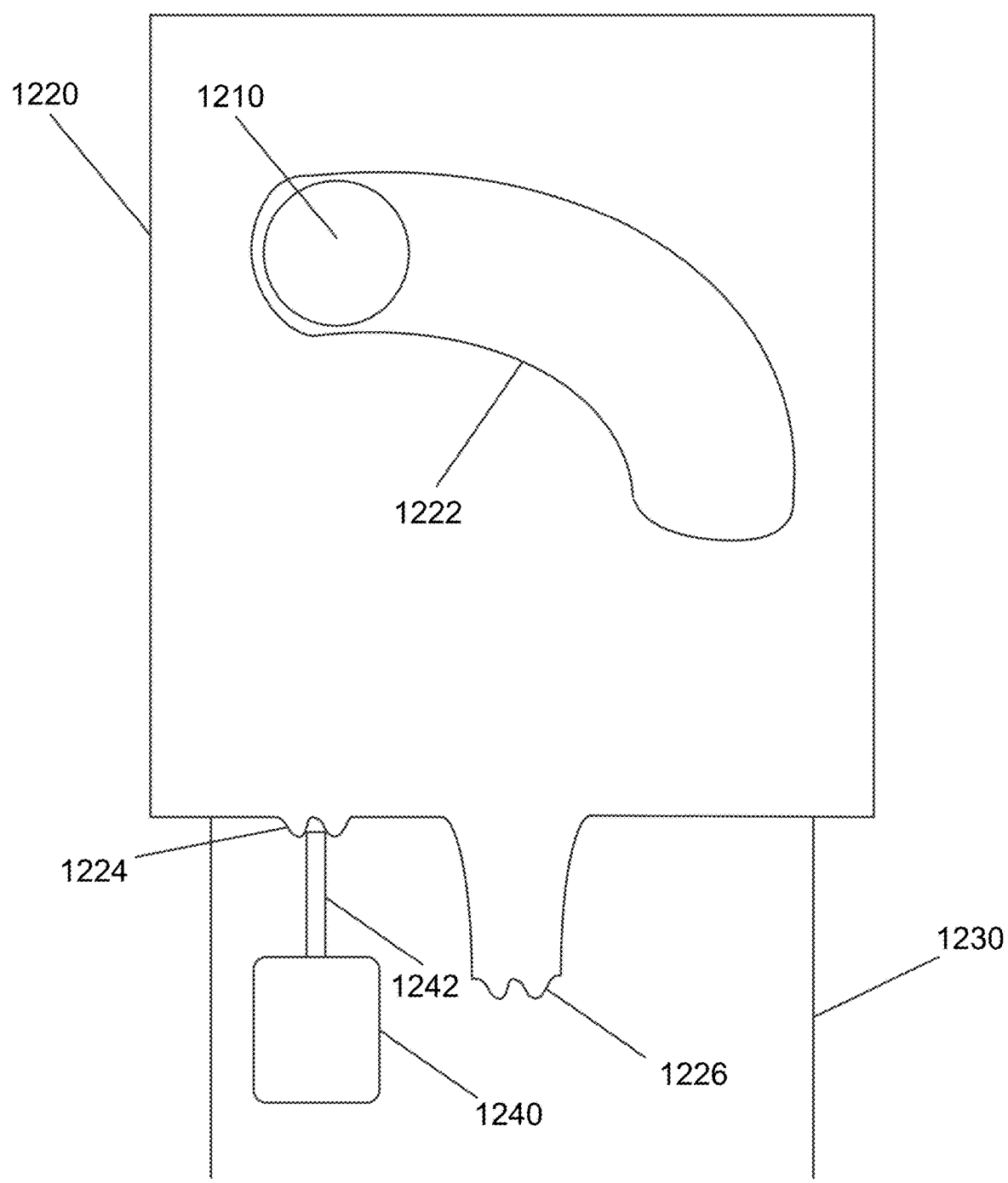
FIG. 12A is a side view illustrating a decompressive extinguishing plug nozzle in an active configuration, according to an embodiment of the present invention.
Figure 12B:
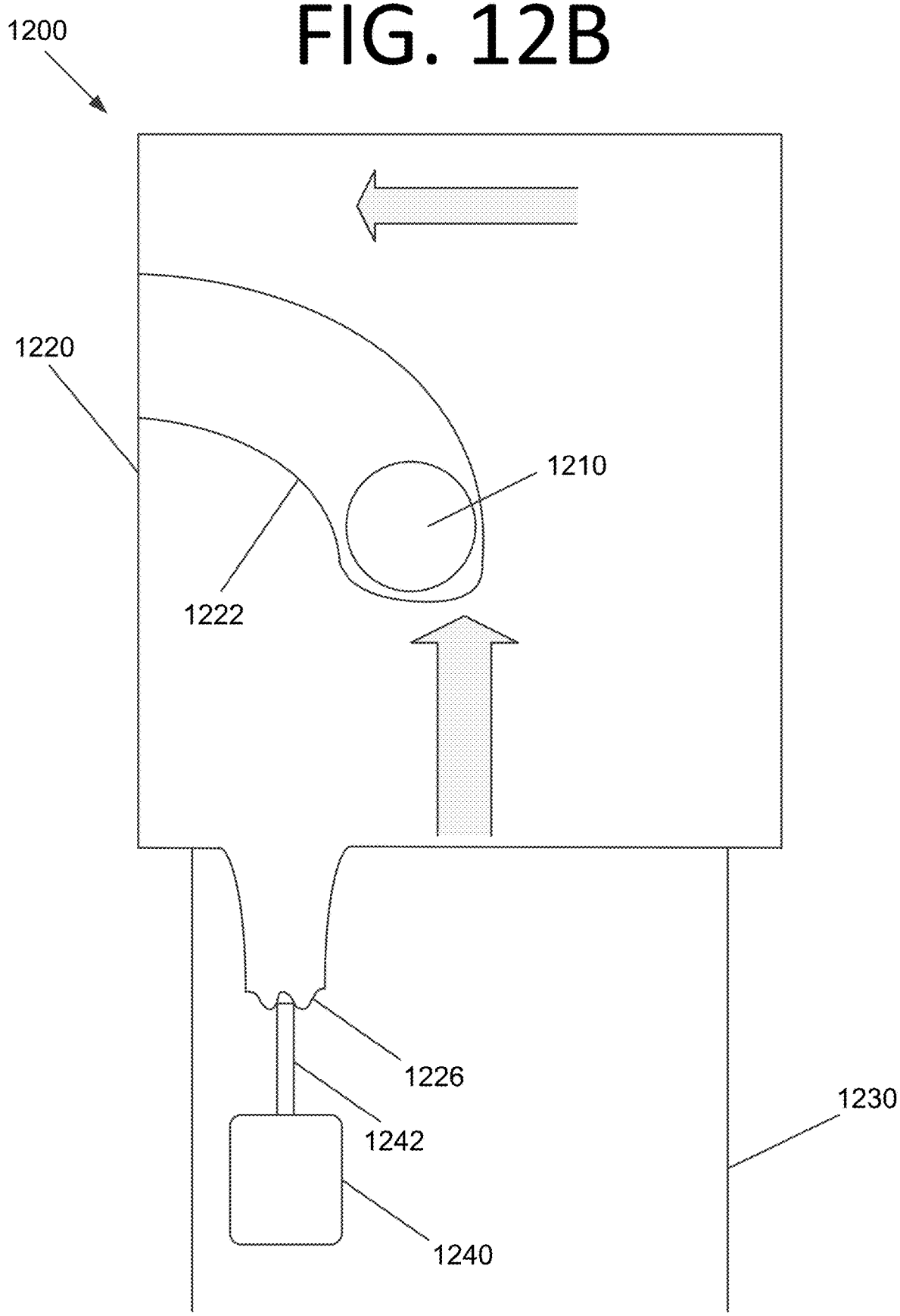
FIG. 12B is a side view illustrating the decompressive extinguishing plug nozzle in a decompressive configuration, according to an embodiment of the present invention.

Such embodiments may be made resettable via a spring, via a spring and another pin holding the decompressive extinguishing plug nozzle in the decompressive position until a command is received, and/or via a solenoid, for example. FIGS. 12A and 12B show a decompressive extinguishing plug nozzle 1200 in an active and decompressive configuration, respectively, according to an embodiment of the present invention. In some embodiments, decompressive extinguishing plug nozzle 1200 is also configured to have a sealed configuration so gas pressure can build in the combustion chamber prior to ignition. As with decompressive extinguishing plug nozzle 1100 of FIGS. 11A-F, decompressive extinguishing plug nozzle 1200 utilizes wheel bearings 1210 sitting on shelves 1222 that define tracks and are formed in a cowl housing 1220. Only one wheel bearing 1210 and shelf 1220 are visible in this embodiment. However, in certain embodiments, only a single wheel bearing and track may be used. Indeed, any desired number, size, shape, and/or location of wheels and shelves may be used without deviating from the scope of the invention. Shelves 1222 define tracks along which wheel bearings 1210 may roll along the edges of respective shelves 1222.

However, in this embodiment, a solenoid 1240 is attached to a rocket body 1230. Solenoid 1240 has a pin 1242 that engages with pin locks 1224, 1226 of cowl housing 1220. With reference to FIG. 12A, when pin 1242 is pulled from pin lock 1224 by solenoid 1240, the combustion chamber pressure generates a torque, causing wheel bearings 1210 to rotate along shelves 1222. Cowl housing 1220 moves both upward and rotates to the left from FIG. 12A to FIG. 12B with respect to the orientations shown therein. Pin 1242 then engages with and locks into pin lock 1226.

In certain embodiments, springs (not shown) may bias cowl housing 1220 in a downward direction with respect to FIGS. 12A and 12B. The springs do not have sufficient strength to overcome the combustion chamber pressure and keep cowl housing 1220 in place when pin 1242 is released in the active configuration. However, once the rocket motor is extinguished, when pin 1242 is released from pin lock 1226 in the decompressive configuration, cowl 1220 can return to the active configuration setting by moving in the opposite directions as those shown in FIG. 12B, returning to the active configuration of FIG. 12A, or to a sealed configuration.

It should be noted that the wheel and rotating cowl concept of FIGS. 11A-12B may be a very scalable mechanism. If the rocket is large, more wheels may be spaced around the cowl. For instance, very large rockets may have many relatively small wheels (e.g., dozens, hundreds, etc.) in some embodiments. Indeed, any desired wheel size, location, track shape, and/or number of wheels/tracks may be used without deviating from the scope of the invention. Such embodiments may be more scalable than those that use pipes containing liquids (e.g., hydraulics), pumps, etc.

Figure 13:
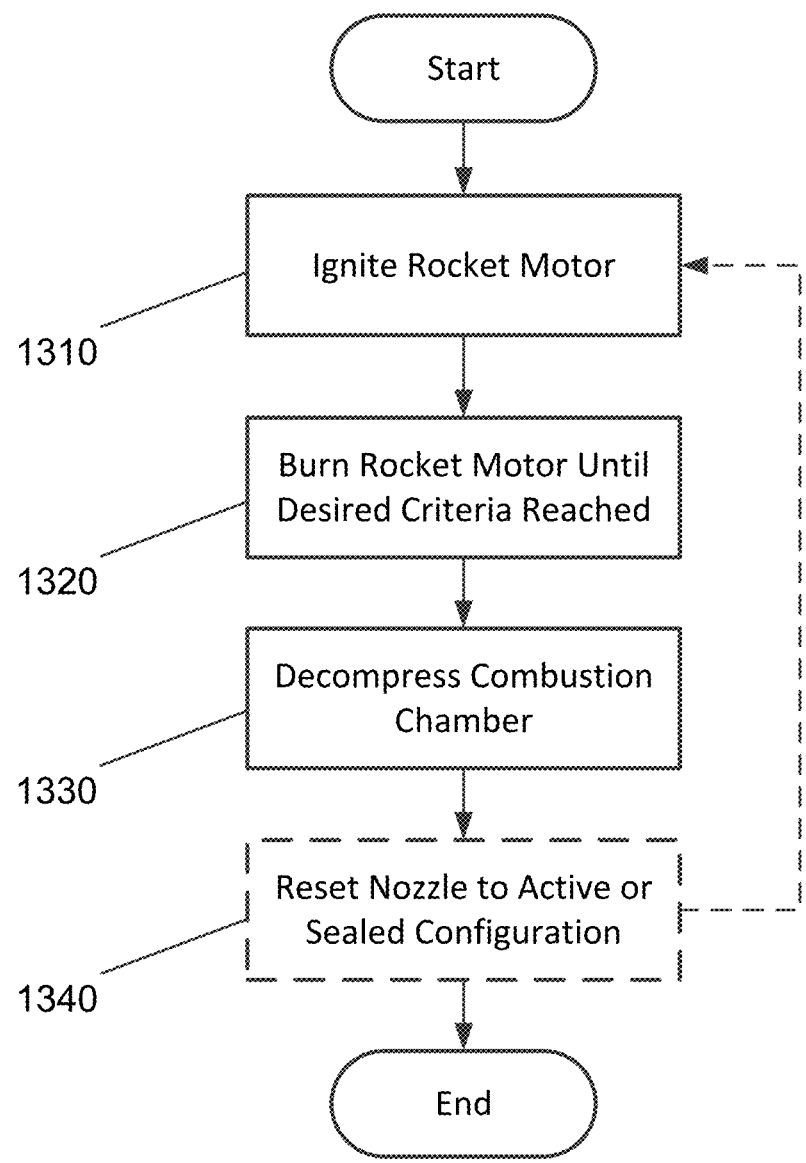
FIG. 13 is a flowchart illustrating a process for facilitating multiple burns with a solid rocket motor, according to an embodiment of the present invention.

FIG. 13 is a flowchart illustrating a process 1300 for facilitating multiple burns with a solid rocket motor, according to an embodiment of the present invention. The process begins with igniting the rocket motor at 1310. For each firing, hydrogen and oxygen are provided to an igniter. The hydrogen and oxygen may be supplied from benign water decomposed on demand into gaseous hydrogen and oxygen by an electrolyzer. The gaseous hydrogen and oxygen may be recombined on a catalyst bed igniter within the combustion chamber to cause high temperatures.

Additionally or alternatively, a spark igniter may be used to ignite the hydrogen and oxygen. The igniter should survive the temperatures and pressures of multiple burns and be reusable in some embodiments. The ignited hydrogen and oxygen then ignite solid fuel, which then burns. In some embodiments, a segmented solid fuel solid oxidizer system or any desired composite monopropellant may then be used. However, the specific fuel and/or oxidizer that is used is not critical in some embodiments, so long as it is capable of combustion and propelling the rocket.

The rocket motor then burns until the desired stopping criteria are reached at 1320. These may include, but are not limited to, a desired total impulse, a desired total change in velocity, and/or any other desired criteria related to the burn without deviating from the scope of the invention. The criteria may be determined from output by one or more accelerometers, for example. Once the desired criteria are achieved for the current burn (e.g., as detected by a computing system analyzing measurements from accelerometer(s)), a nozzle with a mechanically variable throat area affects rapid decompression of the combustion chamber at 1330, resulting in extinguishing of the burn. The nozzle is then reset to an active or sealed configuration at 1340, and the rocket motor may be reignited when desired by returning to step 1310 and repeating the process.

Figure 14:
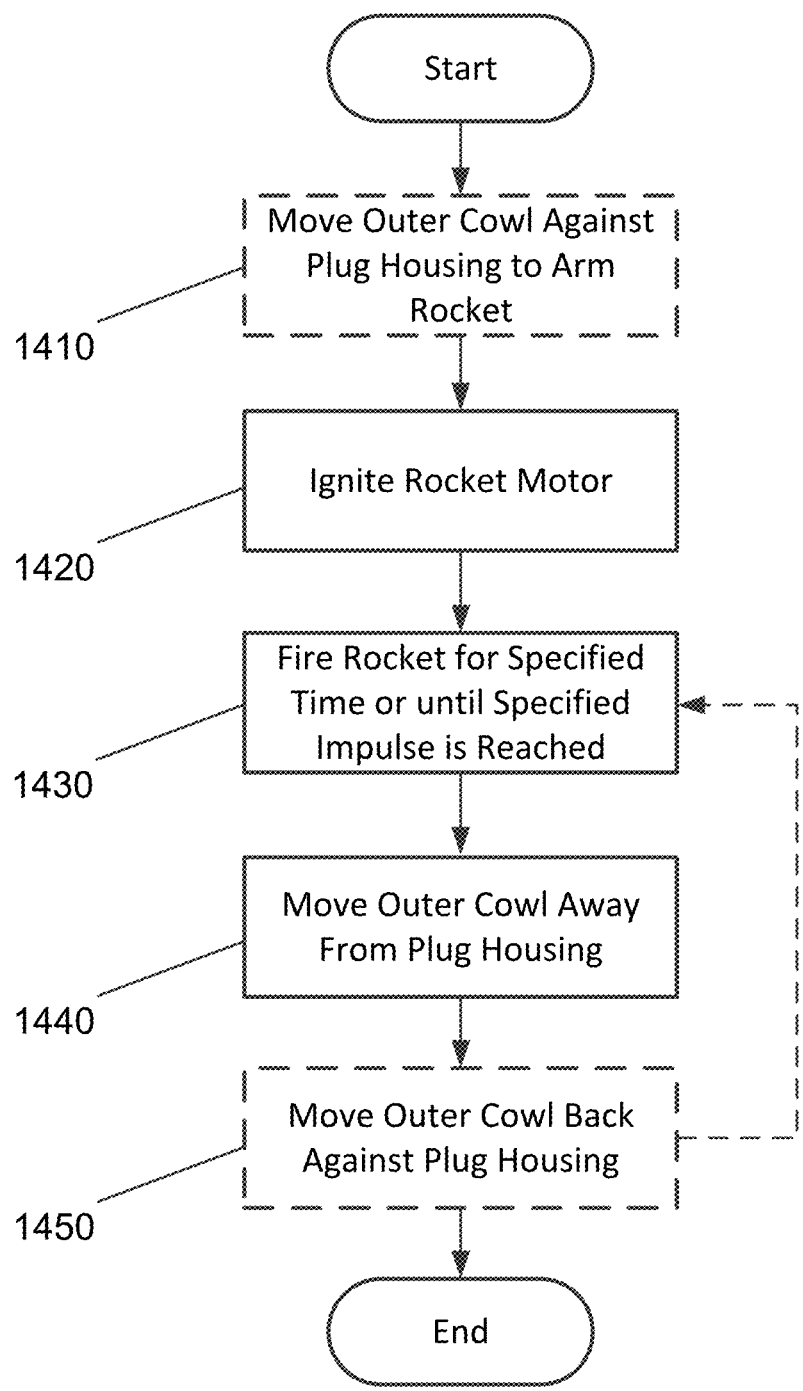
FIG. 14 is a flowchart illustrating a process for extinguishing a solid rocket motor using a decompressive extinguishing plug nozzle, according to an embodiment of the present invention.

FIG. 14 is a flowchart illustrating a process 1400 for extinguishing a solid rocket motor using a decompressive extinguishing plug nozzle, according to an embodiment of the present invention. The process optionally begins with moving the outer cowl against the plug housing to arm the rocket at 1410. In certain embodiments, flying a system in the decompressive configuration for added safety against an accidental impulsive firing may be beneficial. The general concept would be to arm the system by pulling in the cowl to the active or sealed configuration prior to firing the rocket. Such a nozzle may be used just for this safety/arming purpose regardless of extinguishing in certain embodiments.

Then, the rocket motor is ignited at 1420 (which may be the first step in some embodiments per the above). The rocket motor is commanded to fire for a specified time or until a specified impulse is reached at 1430. Computing system 1500, for example, may be used to determine the total velocity change via accelerometers (e.g., accelerometer(s) 1545). After a desired burn time, an outer cowl of a decompressive extinguishing plug nozzle is moved away from a plug housing at 1540. This causes rapid decompression of the combustion chamber, extinguishing the fuel.

In some embodiments, only a single burn and decompression may be desired. However, in other embodiments, the outer cowl is moved back against the plug housing at 650, resetting the decompressive extinguishing plug nozzle to an active or sealed configuration where the rocket motor can be fired again. The process may then proceed to step 620 and be repeated as many times as desired.

Figure 15:
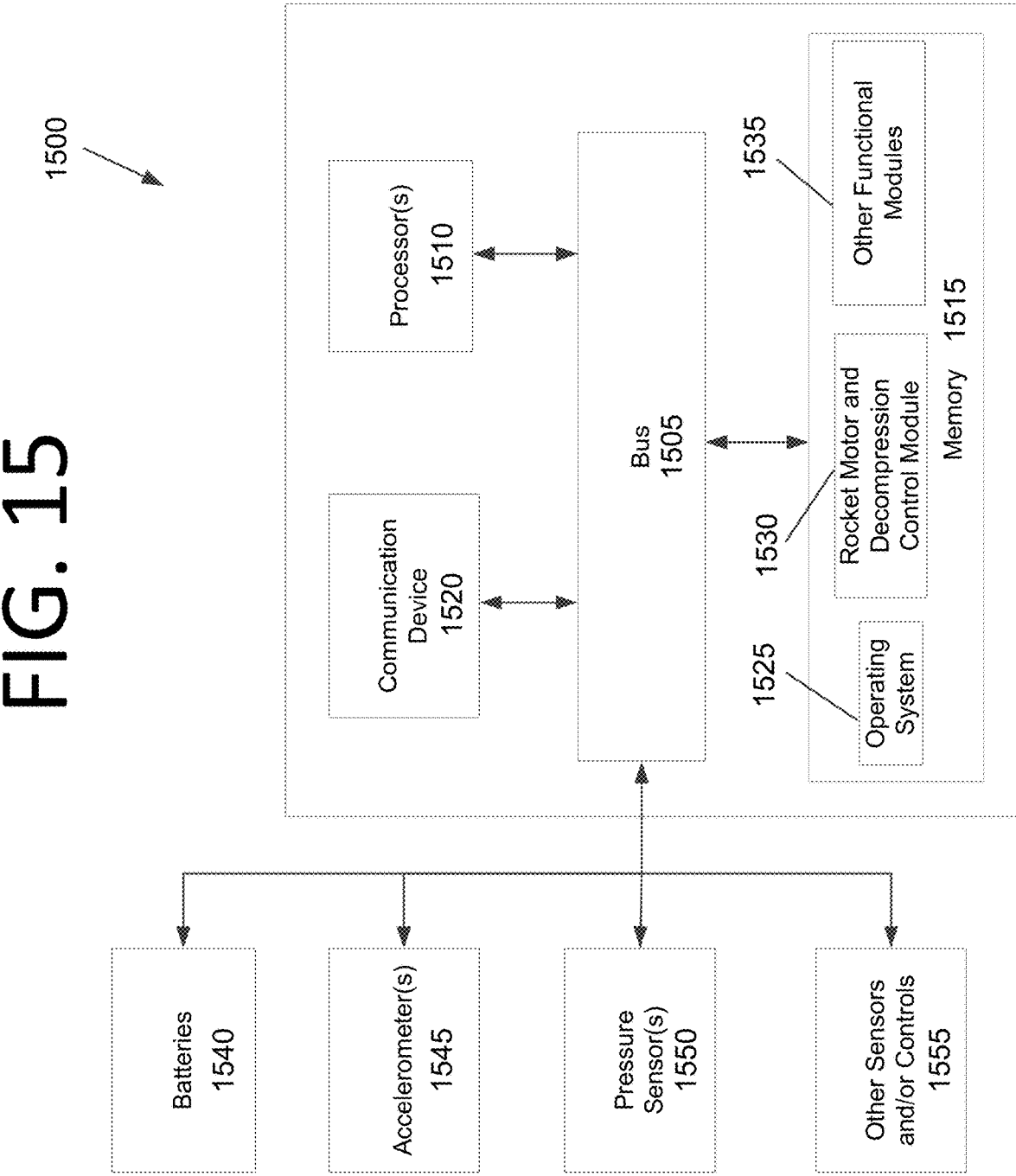
FIG. 15 is a block diagram illustrating a computing system configured to control a solid rocket motor and/or a decompressive extinguishing plug nozzle, according to an embodiment of the present invention.

FIG. 15 is a block diagram illustrating a computing system 1500 configured to control a solid rocket motor and/or a decompressive extinguishing plug nozzle, according to an embodiment of the present invention. Computing system 1500 may be a flight computer, for example. Computing system 1500 includes a bus 1505 or other communication mechanism for communicating information, and processor(s) 1510 coupled to bus 1505 for processing information. Processor(s) 1510 may be any type of general or specific purpose processor, and may be or be a part of a central processing unit (CPU), an application specific integrated circuit (ASIC), a field programmable gate array (FPGA), a system on a chip (SoC), etc. Processor(s) 1510 may also have multiple processing cores, and at least some of the cores may be configured to perform specific functions. Multi-parallel processing may be used in some embodiments. Computing system 1500 further includes a memory 1515 for storing information and instructions to be executed by processor(s) 1510. Memory 1515 can be comprised of any combination of random access memory (RAM), read only memory (ROM), flash memory, cache, static storage such as a magnetic or optical disk, or any other types of non-transitory computer-readable media or combinations thereof. Additionally, computing system 1500 includes a communication device 1520, such as a transceiver and antenna, to wirelessly provide access to a communications network.

Non-transitory computer-readable media may be any available media that can be accessed by processor(s) 1510 and may include volatile media, non-volatile media, or both. The media may also be removable, non-removable, or both.

Batteries 1540 provide power to computing system 1500, and potentially to other systems as well.

Memory 1515 stores software modules that provide functionality when executed by processor(s) 1510. The modules include an operating system 1525 for computing system 1500. The modules further include a rocket motor and decompression control module 1530 that is configured to control a solid rocket system and/or a decompressive extinguishing plug nozzle thereof. Computing system 1500 may include one or more additional functional modules 1535 that include additional functionality.

Batteries 1540 provide power to computing system 1500, and potentially to other systems as well. It may be beneficial to track rocket performance using various sensors. Accordingly, computing system 1500 includes accelerometer(s) 1545 for tracking rocket accelerations, pressure sensor(s) 1550 for tracking pressure within the combustion chamber, for example, and other sensors and/or controls 1555 (e.g., cameras, actuators controlling flight control surfaces, etc.) that may allow the rocket to monitor its performance and control flight.

One skilled in the art will appreciate that a "system" could be embodied as a flight control computer, an embedded computing system, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 13 and 14 may be controlled by a computer program, encoding instructions for the processor(s) to facilitate at least the process(es) described in FIGS. 13 and 14, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor(s) to implement the process(es) described in FIGS. 13 and 14.

The computer program can be implemented in hardware, software, or a hybrid implementation. The computer program can be composed of modules that are in operative communication with one another. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

In an embodiment, a multiple burn rocket system includes a hydrogen gas source and an oxygen gas source that provide gaseous hydrogen and oxygen, respectively. The system also includes a combustion chamber that is provided with the hydrogen gas and the oxygen gas and an igniter configured to ignite the hydrogen gas and the oxygen gas. The igniter is located at least partially in the combustion chamber. The system further includes fuel located within the combustion chamber that is ignited by the igniter. Additionally, the system includes a decompressive nozzle that is configured to allow the fuel to burn in an active configuration and to extinguish the fuel in a decompressive configuration. In some embodiments, the system is configured to reignite the fuel after the fuel is extinguished. In certain embodiments, the decompressive nozzle is a decompressive extinguishing plug nozzle.

In some embodiments the system further includes an electrolyzer that has access to a water source. The electrolyzer is configured to produce hydrogen gas and oxygen gas via electrolysis. In certain embodiments, the electrolyzer is a PEM electrolyzer that separates hydrogen and oxygen from the water via the PEM. The electrolyzer may include anode and cathode electrodes that are supplied with current from a power source. In some embodiments, the electrolyzer is a single cell electrolyzer. In certain embodiments, the electrolyzer is a multi-cell electrolyzer that includes at least one wet cell and at least one dry cell.

In some embodiments, the igniter is a catalytic igniter that includes a catalysts bed where the hydrogen gas and the oxygen gas are recombined, producing heat and igniting the fuel. In certain embodiments, the catalyst bed includes alumina and iridium, or a precious metal catalyst. In some embodiments, the igniter is a spark igniter that is configured to directly ignite the hydrogen gas and the oxygen gas. In certain embodiments, the igniter is constructed from a steel alloy and/or a metalized ceramic.

In some embodiments, the system includes an oxidizer that facilitates more efficient combustion of the fuel. In certain embodiments the system includes a computing system and an accelerometer. The computing system is configured to control the operation of the system, and to extinguish and/or reignite the fuel based on input form the accelerometer.

In another embodiment, a multiple burn rocket system includes a water source and a PEM electrolyzer operably connected to the water source. The PEM electrolyzer is configured to create hydrogen gas and oxygen gas from the water source. The system also includes a combustion chamber that is provided with the hydrogen gas and the oxygen gas produced by the electrolyzer and an igniter configured to ignite the hydrogen gas and the oxygen gas. The igniter is located at least partially in the combustion chamber. The system further includes fuel located within the combustion chamber that is ignited by the igniter. Additionally, the system includes a decompressive nozzle that is configured to allow the fuel to burn in an active configuration and to extinguish the fuel in a decompressive configuration.

In yet another embodiment, a multiple burn rocket system includes a water source and a PEM electrolyzer operably connected to the water source. The PEM electrolyzer is configured to create hydrogen gas and oxygen gas from the water source. The system also includes a combustion chamber that is provided with the hydrogen gas and the oxygen gas produced by the electrolyzer. The system further includes a catalytic igniter or a spark igniter configured to ignite the hydrogen gas and the oxygen gas. The igniter is located at least partially in the combustion chamber. Additionally, the system includes fuel located within the combustion chamber that is ignited by the igniter and an oxidizer that facilitates more efficient combustion of the fuel. Additionally, the system includes a decompressive extinguishing plug nozzle that is configured to allow the fuel to burn in an active configuration and to extinguish the fuel in a decompressive configuration.

In still another embodiment, a method includes igniting a rocket motor using an igniter and a supply of hydrogen gas and oxygen gas and allowing the rocket motor to burn until a desired impulse is reached. After the desired impulse is reached, the method also includes decompressing a combustion chamber of the rocket motor via a decompressive nozzle, thereby extinguishing the rocket motor. In some embodiments, the method further includes resetting the decompressive nozzle to an active configuration, or to a sealed configuration followed by an active configuration, and reigniting the rocket motor. In certain embodiments, the process may be repeated an arbitrary number of times based on fuel constraints.

In an embodiment, a solid fuel rocket includes a decompressive extinguishing plug nozzle having a variable mechanical throat defining a choked sonic flow when the decompressive extinguishing plug nozzle is in an active configuration, a combustion chamber, and a computing system configured to control operation of the solid fuel rocket. The computing system is configured to control the decompressive extinguishing plug nozzle to transition from an active configuration that allows solid rocket fuel in the combustion chamber to burn to a decompressive configuration where the solid rocket fuel is extinguished by increasing an area of the variable mechanical throat of the decompressive extinguishing plug nozzle. In certain embodiments, the decompressive extinguishing plug nozzle is configured to transition from a sealed configuration to an active configuration to a decompressive configuration, and then back to the sealed configuration.

In some embodiments, the decompressive extinguishing plug nozzle is attached to a body of the solid fuel rocket. In certain embodiments, the decompressive extinguishing plug nozzle includes an outer cowl, a cowl housing, and a plug. In certain embodiments, the decompressive extinguishing plug nozzle further includes a plug ring defining a nozzle and located within the outer cowl. In some embodiments, the plug ring and the plug provide an aerospike nozzle due to a shape and position of the plug with respect to the plug ring such that the plug does not completely impede the nozzle defined by the plug ring, and rocket exhaust is able to pass around the plug and out through the plug ring via a gap therebetween.

In some embodiments, the decompressive extinguishing plug nozzle includes a plug housing that houses the plug, the plug housing connected to the plug via a plug seal. The plug seal seals against an inside of a body of the solid fuel rocket around its peripheral edges, located downstream from the combustion chamber. In certain embodiments, the plug seal includes passages that allow exhaust to flow around the plug through the plug housing and the plug ring, and then out of the nozzle defined by the plug ring. In some embodiments, the decompressive extinguishing plug nozzle includes springs that bias the decompressive extinguishing plug nozzle into a sealed configuration when there is insufficient gas pressure in the combustion chamber to move the decompressive extinguishing plug nozzle into an active configuration. In certain embodiments, in addition to or in lieu of springs, decompressive extinguishing plug nozzle includes vents configured to close to put the decompressive extinguishing plug nozzle in the sealed configuration and open to put the decompressive extinguishing plug nozzle in the active configuration.

In some embodiments, a volume surrounding the plug and defined by the plug, the plug housing, and the outer cowl provides the mechanically variable throat. In certain embodiments, one or more movement mechanisms facilitate movement between the active configuration and the decompressive configuration by moving the outer cowl so as to increase an area of the mechanically variable throat, or by allowing the outer cowl to be moved by a combustion chamber pressure. In certain embodiments, the solid fuel rocket includes one or more accelerometers that provide acceleration information to the computing system. In some embodiments, the solid fuel rocket includes one or more pressure sensors that provide pressure information in the combustion chamber, the decompressive extinguishing plug nozzle, or both, to the computing system. In certain embodiments, the computing system is configured to cause the decompressive extinguishing plug nozzle to transition from the active configuration to the decompressive configuration when data from the one or more pressure sensors indicates that the pressure is above a threshold value and/or has deviated beyond a tolerance from an expected pressure profile.

In some embodiments, the plug housing of the decompressive extinguishing plug nozzle includes a first lip and the outer cowl or a cowl housing includes a second lip. The first lip and the second lip are configured to limit a range of motion of the outer cowl when the decompressive extinguishing plug nozzle transitions from the active configuration to the decompressive configuration. In certain embodiments, the plug is operably connected to a rod that is operably connected to the plug seal. The rod may be more flexible and less brittle than the plug. In some embodiments, passages may be provided in the plug housing to vent out transverse to the direction of travel, passages may be provided in the lip to vent therefrom, and/or passages may be included in the outer cowl to ensure that gasses that are unintentionally vented into the volume between the outer cowl and the plug housing can leave the decompressive extinguishing plug nozzle.

In some embodiments, the decompressive extinguishing plug nozzle includes one or more wheel bearings sitting on one or more respective shelves that are formed in the cowl housing. The one or more shelves define tracks along which respective wheel bearings roll along the edges of respective shelves. In certain embodiments, the one or more wheel bearings are attached to a body of the solid fuel rocket. In some embodiments, a portion of the cowl housing surrounds the rocket body.

In some embodiments, a solenoid is attached to the body of the solid fuel rocket. In certain embodiments, the solenoid has a pin that engages with pin locks of the cowl housing and facilitates rotation of the cowl housing and the transition between the active configuration and the decompressive configuration.

In another embodiment, a method for controlling a decompressive extinguishing plug nozzle includes moving an outer cowl against a plug housing into a sealed configuration or an active configuration to arm a solid fuel rocket. The method also includes igniting a rocket motor of the solid fuel rocket and commanding the rocket motor to fire for a specified time or until a specified impulse is reached. Once the specified time elapses or the specified impulse is reached, the method further includes moving the outer cowl away from the plug housing and into a decompressive configuration, causing the rocket motor to be extinguished. In some embodiments, the process of firing and extinguishing the rocket motor is then repeated. In certain embodiments, if a pressure is detected in the combustion chamber, the extinguishing plug nozzle, or both, the method includes moving the outer cowl away from the plug housing and into a decompressive configuration, causing the rocket motor to be extinguished.

In yet another embodiment, a decompressive extinguishing plug nozzle includes an outer cowl, a cowl housing, a plug, a plug housing, and a plug seal. The plug housing houses the plug and is connected to the plug via a plug seal. The plug seal seals against an inside of a body of the solid fuel rocket around its peripheral edges, located downstream from the combustion chamber. A volume surrounding the plug and defined by the plug, the plug housing, and the outer cowl provides the mechanically variable throat. In certain embodiments, the plug seal includes passages that allow exhaust to flow around the plug through the plug housing and the plug ring, and then out of the nozzle defined by the plug ring.

In some embodiments, the decompressive extinguishing plug nozzle also includes a plug ring defining a nozzle and located within the outer cowl. In certain embodiments, the plug ring and the plug provide an aerospike nozzle due to a shape and position of the plug with respect to the plug ring such that the plug does not completely impede the nozzle defined by the plug ring, and rocket exhaust is able to pass around the plug and out through the plug ring via a gap therebetween.

In some embodiments, the plug housing of the decompressive extinguishing plug nozzle includes a first lip and the outer cowl or a cowl housing includes a second lip. The first lip and the second lip are configured to limit a range of motion of the outer cowl when the decompressive extinguishing plug nozzle transitions from an active configuration to a decompressive configuration. In certain embodiments, the plug is operably connected to a rod that is operably connected to the plug seal. The rod may be more flexible and less brittle than the plug. In some embodiments, passages may be provided in the plug housing to vent out transverse to the direction of travel, passages may be provided in the lip to vent therefrom, and/or passages may be included in the outer cowl to ensure that gasses that are unintentionally vented into the volume between the outer cowl and the plug housing can leave the decompressive extinguishing plug nozzle.

In still another embodiment, a decompressive extinguishing plug nozzle includes a cowl housing that includes one or more respective shelves formed in the cowl housing. The one or more shelves define tracks along which respective wheel bearings of a rocket body roll along the edges of respective shelves. In some embodiments, a portion of the cowl housing surrounds the rocket body. The tracks facilitate movement of the cowl housing between an active state and a decompressive state of the decompressive extinguishing plug nozzle (and in some embodiments, vice versa).

In some embodiments, the cowl housing includes pin locks for each of the active configuration and the decompressive configuration. A solenoid is attached to the body of the solid fuel rocket may include a pin that engages with the pin locks of the cowl housing and facilitates rotation of the cowl housing and the transition between the active configuration and the decompressive configuration.

The invention claimed is:

1. A decompressive extinguishing plug nozzle, comprising:
   an outer cowl, wherein shelves formed in the outer cowl define a track along which a wheel bearing is configured to traverse;
   a plug;
   a plug housing that houses the plug;
   a plug seal, wherein the plug housing is connected to the plug via the plug seal, and wherein the plug seal is configured to seal against an inside of a rocket body downstream from a combustion chamber; and
   a mechanically variable throat at least partially defined by the outer cowl and the plug, wherein traversal of the wheel bearing along the track is configured to cause movement of the outer cowl relative to the plug thereby transitioning the decompressive extinguishing plug nozzle from a sealed configuration to an active configuration, wherein the mechanically variable throat defines a choked sonic flowpath in the active configuration.

2. The decompressive extinguishing plug nozzle of claim 1, wherein the decompressive extinguishing plug nozzle is configured to transition from the sealed configuration to the active configuration to a decompressive configuration, and then back to the sealed configuration.

3. The decompressive extinguishing plug nozzle of claim 1, wherein the plug seal comprises passages that allow exhaust to flow around the plug through the plug housing and a plug ring, and then out of a nozzle defined by the plug ring.

4. The decompressive extinguishing plug nozzle of claim 1, wherein
   the plug housing comprises a first lip,
   the outer cowl or a cowl housing comprises a second lip, and
   the first lip and the second lip are configured to limit a range of motion of the outer cowl as the decompressive extinguishing plug nozzle transitions from the active configuration to a decompressive configuration.

5. The decompressive extinguishing plug nozzle of claim 1, further comprising:
   a rod operably coupled to the plug seal.

6. The decompressive extinguishing plug nozzle of claim 1, further comprising:
   a plug ring defining a nozzle and located within the outer cowl, wherein the plug ring is at least partially within the outer cowl.

7. The decompressive extinguishing plug nozzle of claim 1, further comprising:
   one or more springs configured to bias the decompressive extinguishing plug nozzle into the sealed configuration in response to insufficient gas pressure in the combustion chamber of a rocket to move the decompressive extinguishing plug nozzle into the active configuration.

8. The decompressive extinguishing plug nozzle of claim 1, further comprising:
   one or more vents, wherein when closed, the one or more vents bias the decompressive extinguishing plug nozzle into the sealed configuration, and when open, the one or more vents bias the decompressive extinguishing plug nozzle into the active configuration.

9. The decompressive extinguishing plug nozzle of claim 1, further comprising:
   one or more movement mechanisms configured to facilitate movement between the active configuration and a decompressive configuration by moving the outer cowl to increase an area of the mechanically variable throat.

10. The decompressive extinguishing plug nozzle of claim 1, further comprising:
    a cowl housing configured to receive the outer cowl.

11. A decompressive extinguishing plug nozzle, comprising:
    an outer cowl, wherein shelves formed in the outer cowl define a track along which a wheel bearing is configured to traverse;
    a plug;
    a plug housing that houses the plug;
    a plug seal; and
    a mechanically variable throat at least partially defined by the outer cowl and the plug, wherein traversal of the wheel bearing along the track is configured to cause movement of the outer cowl relative to the plug thereby transitioning the decompressive extinguishing plug nozzle from a sealed configuration to an active configuration, wherein the mechanically variable throat defines a choked sonic flowpath in the active configuration, and wherein the plug seal is configured to seal against an inside of a rocket body downstream from a combustion chamber.

12. The decompressive extinguishing plug nozzle of claim 11, wherein
    the plug housing is connected to the plug via the plug seal,
    the plug housing comprises a first lip,
    the outer cowl or a cowl housing comprises a second lip, and
    the first lip and the second lip are configured to limit a range of motion of the outer cowl as the decompressive extinguishing plug nozzle transitions from the active configuration to a decompressive configuration.

13. The decompressive extinguishing plug nozzle of claim 11, wherein the decompressive extinguishing plug nozzle is configured to transition from the sealed configuration to the active configuration to a decompressive configuration, and then back to the sealed configuration.

14. The decompressive extinguishing plug nozzle of claim 11, wherein the plug seal comprises passages that allow exhaust to flow around the plug through the plug housing and a plug ring, and then out of a nozzle defined by the plug ring.

15. The decompressive extinguishing plug nozzle of claim 11, further comprising:
a rod operably coupled to the plug seal.

16. The decompressive extinguishing plug nozzle of claim 11, further comprising:
one or more springs configured to bias the decompressive extinguishing plug nozzle into the sealed configuration in response to insufficient gas pressure in the combustion chamber of a rocket to move the decompressive extinguishing plug nozzle into the active configuration;
one or more vents, wherein when closed, the one or more vents bias the decompressive extinguishing plug nozzle into the sealed configuration, and when open, the one or more vents bias the decompressive extinguishing plug nozzle into the active configuration; or
one or more movement mechanisms configured to facilitate movement between the active configuration and a decompressive configuration by moving the outer cowl to increase an area of the mechanically variable throat.

17. A decompressive extinguishing plug nozzle, comprising:
an outer cowl, wherein shelves formed in the outer cowl define a track along which a wheel bearing is configured to traverse;
a plug;
a plug housing that houses the plug;
a plug seal, wherein the plug housing is connected to the plug via the plug seal, and wherein the plug seal is configured to seal against an inside of a rocket body downstream from a combustion chamber, and
a mechanically variable throat at least partially defined by the outer cowl and the plug, wherein traversal of the wheel bearing along the track is configured to cause movement of the outer cowl relative to the plug thereby transitioning the decompressive extinguishing plug nozzle from an active configuration to a decompressive configuration, wherein the mechanically variable throat defines a choked sonic flowpath in the active configuration, and wherein the mechanically variable throat is also defined in part by the plug housing.

18. The decompressive extinguishing plug nozzle of claim 17, wherein
the plug housing comprises a first lip,
the outer cowl or a cowl housing comprises a second lip, and
the first lip and the second lip are configured to limit a range of motion of the outer cowl as the decompressive extinguishing plug nozzle transitions from the active configuration to the decompressive configuration.

* * * * *